United States Patent
Tanaka et al.

(10) Patent No.: US 7,771,037 B2
(45) Date of Patent: Aug. 10, 2010

(54) LIQUID SPRAYING METHOD USING A RECORDING LIQUID HAVING A PH OF 4-6

(75) Inventors: Yasuhiro Tanaka, Kanagawa (JP); Toshio Fukuda, Kanagawa (JP); Masato Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 12/027,821

(22) Filed: Feb. 7, 2008

(65) Prior Publication Data

US 2008/0129811 A1 Jun. 5, 2008

Related U.S. Application Data

(62) Division of application No. 10/542,547, filed as application No. PCT/JP2004/000579 on Jan. 23, 2004, now abandoned.

(30) Foreign Application Priority Data

| Jan. 24, 2003 | (JP) | 2003-015979 |
| Jan. 8, 2004 | (JP) | 2004-003447 |

(51) Int. Cl.
*G01D 11/00* (2006.01)

(52) U.S. Cl. ........... 347/100; 106/31.27; 106/31.33; 106/31.48; 106/31.65; 106/31.89; 347/101; 523/160; 523/161; 526/62

(58) Field of Classification Search ............ None
See application file for complete search history.

(56) References Cited

U.S. PATENT DOCUMENTS

| 5,667,571 | A | * | 9/1997 | Ono et al. ............. 106/31.48 |
| 6,281,269 | B1 | | 8/2001 | Schut |
| 6,517,199 | B1 | | 2/2003 | Tomioka |
| 7,172,275 | B2 | * | 2/2007 | Hiraoka et al. ............. 347/100 |
| 2002/0093557 | A1 | * | 7/2002 | Takuhara et al. ............ 347/100 |
| 2002/0130937 | A1 | | 9/2002 | Hadjisoteriou |
| 2003/0041777 | A1 | * | 3/2003 | Karl et al. ................ 106/31.65 |
| 2004/0155946 | A1 | | 8/2004 | Nagai |

FOREIGN PATENT DOCUMENTS

| EP | 1247847 | 10/2002 |
| JP | 08-060059 | 3/1996 |
| JP | 1997-85949 | 9/1998 |
| JP | 2001-192582 | 7/2001 |
| JP | 2002-020656 | 1/2002 |
| JP | 2002-294117 | 10/2002 |
| JP | 2002-332437 | 11/2002 |
| JP | 2002-332438 | 11/2002 |
| JP | 2002-338863 | 11/2002 |
| JP | 2003-003103 | 1/2003 |

\* cited by examiner

*Primary Examiner*—Matthew Luu
*Assistant Examiner*—John P Zimmermann
(74) *Attorney, Agent, or Firm*—Sonnenschein Nath & Rosenthal LLP

(57) ABSTRACT

An ink containing a hydrophobic colloid charged with a positive zeta potential when the pH of the ink is within a range of over 4 and under 6. Silicon or silicon compound can be limited from being eluted into the ink from a circuit board formed from a silicon wafer or the like. Additionally, silicon or silicon compound, if eluted into the ink can be prevented from being deposited on a resistance heater and causing "cogation", or to prevent the silicon or silicon compound from being deposited in an ink channel and nozzle to clog the nozzle.

3 Claims, 13 Drawing Sheets

LIQUID SPRAYING METHOD USING A RECORDING LIQUID HAVING A PH OF 4-6

RELATED APPLICATION DATA

This application is a divisional of U.S. patent application Ser. No. 10/542,547, filed Jan. 6, 2006, the entirety of which is incorporated herein by reference to the extent permitted by law. Application Ser. No. 10/542,547 is the Section 371 National Stage of PCT/JP2004/000579 filed on Jan. 23, 2004. The present application also claims priority to Japanese Patent Application No. 2003-015979 filed in the Japanese Patent Office on Jan. 24, 2003 and Japanese Patent Application No. 2004-003447 filed in the Japanese Patent Office on Jan. 8, 2004.

TECHNICAL FIELD

The present invention relates to a liquid composition that flows through a predetermined channel, a recording liquid for making recording to an object, a liquid cartridge containing the recording liquid, a liquid spraying cartridge that sprays the recording liquid contained in the liquid cartridge, and a liquid spraying apparatus and method.

BACKGROUND ART

It is well known to supply a liquid composition, through a fine-structure channel, to a liquid chamber provided with an energy-producing means such as a piezoelectric element, resistance heater or the like and pressurize the liquid composition thus supplied under an energy produced by the energy-producing means for spraying as droplets from a spray nozzle provided at the liquid chamber.

As a typical one of the conventional liquid spraying apparatuses, an ink-jet printer is known in which ink is sprayed from head tips to, for example, recording paper as an object to form graphics and/or characters on the paper.

The inkjet printer is advantageous because of its low running cost, compact design and easy printing of an image in colors. In the inkjet printer, ink of colors such as yellow, magenta, cyan, black and others is supplied from ink cartridges filled with the respective ink to an ink chamber or the like in each of the head tips.

In the ink jet printer, ink supplied to the ink chamber or the like is pressurized in the ink chamber by a pressure-producing element such as a resistance heater or the like provided in the ink chamber for spraying from tiny holes, namely, so-called nozzles, formed in each head tip. More particularly, the ink in the ink chamber is heated by the resistance heater provided in the ink chamber to produce bubbles in the ink on the resistance heater, and the ink is sprayed from the nozzles under a pressure produced when the bubbles break up and disappear for projection onto recording paper or the like to form graphics and/or characters on the paper.

In the printer of this ink jet type, the performance of ink spraying from the nozzles of the head tips has a large influence on the quality of images formed on the paper. Therefore, head tips that can be produced with an improved precision, such as head tips each formed form a wafer of silicon or silicon oxide, for example, and having a resistance heater embedded therein, have become marked.

More particularly, such head tips include head tips built by forming a resistance heater on a silicon wafer and each of which uses the end face of the silicon wafer as a channel for guiding ink to the ink chamber.

In such a head tip, the surface of the silicon wafer on which the resistance heater is formed is oxidized so that the silicon or silicon oxide will not be eluted into the ink even if it is exposed to the ink. However, the process of production will make it difficult to oxidize the end face of the silicon wafer and the silicon or silicon oxide will be eluted into the ink if it is exposed to the ink as the case may be. Especially in the case of alkaline ink whose pH is higher than 7, silicon will heavily be eluted from the silicon wafer into the ink. It should be noted that most of the ink for printing to paper are alkalescent in order to prevent metallic portions of the head tips from being oxidized.

If the metallic portions of the had tip are so oxidized, melting of the silicon wafer will lower the dimensional accuracy of the head tips, leading to deterioration of the ink spraying performance, quality deterioration of images formed on the paper, non-spraying of the ink and other troubles as the case may be.

Also, the silicon elution from the silicon wafer will lower the bonding strength at the junction between the silicon wafer and other parts joined to the silicon wafer, so that the other parts will be separated from the silicon wafer, which will possibly damage the head tips.

In case the ink chamber and channel are formed from the silicon wafer, such silicon elution from the silicon wafer will lower the dimensional accuracy of the chamber and channel, possibly resulting in deterioration of the spraying performance of the had tip.

In the ink having the silicon or silicon oxide eluted therein, the stability of dye dispersion is lost so that the dye will possibly deposit and clog the nozzle.

As the ink solvent evaporates, the silicon or silicon oxide eluted in the ink will cause super-saturation of the ink and deposit in the ink and clog the nozzle to possibly cause non-spraying of the ink.

Also, the silicon or silicon oxide eluted in the ink will have the solubility thereof increased in the ink heated around the resistance heater and will thus melt excessively in the ink, and deposit on the resistance heater due to rapid cooling after the ink is sprayed. Namely, the elution of the silicon or silicon oxide will possibly cause the so-called "cogation". In the head tip in which the "cogation" has thus occurred on the resistance heater, it will be difficult to heat the ink appropriately, causing the non-spraying of the ink.

To solve the above-mentioned problems of the conventional techniques, it has been proposed to design a head tip structure in which the silicon wafer will not be exposed to the ink or making surface treatment of the silicon wafer to prevent the silicon or silicon oxide from being eluted from the silicon wafer. More specifically, it is proposed in the Japanese Patent Application Laid Open No. 85949 of 1997 to provide a layer of SiN, TiN, TiO or the like on the surface of the silicon wafer, for example.

The above proposals permit to prevent the silicon or silicon oxide from being eluted from the silicon wafer into the ink, but they are not advantageous in that the number of steps of producing the head tips is increased, resulting in an increased manufacturing cost and lower yield. The printer product including the head tips will be very expensive. Also, in case a layer is provided on the surface of the silicon wafer as above, there is no pin hole and it is difficult to form the layer to a generally uniform thickness, which will also lower the yield.

The aforementioned troubles will arise not only in case the silicon wafer is used to form the head tips but in case the head tips in which the silicon-containing material such as a glass substrate is exposed are in contact with the ink, namely, in case the silicon-containing material is exposed in a channel in which alkaline ink flows.

DISCLOSURE OF THE INVENTION

Accordingly, the present invention has an object to overcome the above-mentioned drawbacks of the related art by providing a liquid composition into which silicon is prevented from being eluted, whereby a silicon-containing material can be prevented from depositing in the liquid and clogging a channel or spray nozzle, recording liquid using the liquid composition, a liquid cartridge containing the recording liquid, a liquid spraying cartridge housing the liquid cartridge, and a liquid spraying apparatus and method in which the recording liquid contained in the liquid spraying cartridge is used to assure a high quality of printed images.

The Inventors of the present invention completed the present invention capable of overcoming the above-mentioned drawbacks of the related art by finding that it is possible to prevent silicon or silicon compound from being eluted from a silicon-containing material into liquid which is to flow through a channel in which a silicon-containing material is exposed by including, in the liquid, a hydrophobic colloid which is not included as impurity as far as possible in any conventional ink used to make recording to an object such as paper or the like, more specifically, by including, in the liquid, a hydrophobic colloid that will be charged with a positive zeta potential when the liquid's pH is controlled to a range of over 4 and under 6.

The above object can be attained by providing a liquid composition which is to flow through a channel in which a silicon-containing material is exposed, the composition containing, according to the present invention, a solvent; and a hydrophobic colloid that is charged with a positive zeta position when the pH of the composition is controlled to a range of over 4 and under 6.

Also the above object can be attained by providing a recording liquid which is guided to a nozzle through a channel in which a silicon-containing material is exposed, and sprayed as droplets from the nozzle for adhesion to an object, the liquid containing, according to the present invention, a pigment; a solvent in which the pigment is dispersed; and a hydrophobic colloid that is charged with a positive zeta potential when the pH of the liquid is controlled to a range of over 4 and under 6.

Also the above object can be attained by providing a liquid cartridge including, according to the present invention, a spraying means for spraying, as droplets from the nozzle, a recording liquid guided to a nozzle through a channel in which a silicon-containing material is exposed, the cartridge being to be housed removably in a spraying means of a liquid spraying apparatus which sprays the liquid as droplets for adhesion to an object, and serve as a source of the recording liquid for the spraying means of the liquid spraying apparatus; and the recording liquid containing a pigment; a solvent in which the pigment is dispersed; and a hydrophobic colloid that is charged with a positive zeta potential when the pH of the liquid is controlled to a range of over 4 and under 6.

Also the above object can be attained by providing a liquid spraying cartridge which is to be housed removably in a liquid spraying apparatus which sprays a recording liquid for adhesion to an object to make recording to the object, the cartridge including, according to the present invention, a liquid container which contains a recording liquid; and a spraying means which guides the recording liquid from the liquid container to a nozzle via a channel in which a silicon-containing material is exposed and sprays the recording liquid as droplets from the nozzle, the recording liquid containing a pigment; a solvent in which the pigment is dispersed; and a hydrophobic colloid that is charged with a positive zeta potential when the pH of the liquid is controlled to a range of over 4 and under 6.

Also the above object can be attained by providing a liquid spraying cartridge including a liquid container which contains a recording liquid, and a spraying means which sprays the recording liquid guided from the liquid container to a nozzle via a channel in which a silicon-containing material is exposed as droplets from the nozzle, the cartridge being to be housed removably in a liquid spraying apparatus which makes recording to an object by making the droplets adhere to the object; and the recording liquid containing a pigment; a solvent in which the pigment is dispersed; and a hydrophobic colloid that is charged with a positive zeta potential when the pH of the liquid is controlled to a range of over 4 and under 6.

Also the above object can be attained by providing a liquid spraying apparatus which makes recording to an object by making a recording liquid adhere to the object, the apparatus, including according to the present invention, a spraying means for spraying, as droplets from the nozzle, the recording liquid, guided to a nozzle via a channel in which a silicon-containing material is exposed; and a liquid cartridge serving a source of the recording liquid for the spraying means; a liquid container which contains a recording liquid, the recording liquid containing a pigment; a solvent in which the pigment is dispersed; and a hydrophobic colloid that is charged with a positive zeta potential when the pH of the liquid is controlled to a range of over 4 and under 6.

Also the above object can be attained by providing a liquid spraying method of making recording to an object by making a recording liquid adhere to the object, wherein the recording liquid contains a pigment; a solvent in which the pigment is dispersed; and a hydrophobic colloid that is charged with a positive zeta potential when the pH of the liquid is controlled to a range of over 4 and under 6; and the recording liquid is guided to a nozzle via a channel in which a silicon-containing material is exposed, and sprayed as droplets from the nozzle.

According to the present invention, the liquid flowing through the channel in which the silicon-containing material is exposed contains at least the hydrophobic colloid that is charged with a positive zeta potential when the pH of the liquid is controlled to a range of over 4 and under 6. Thus, it is possible to prevent silicon or silicon compound from being eluted from the silicon-containing material into the liquid.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Figure 1:
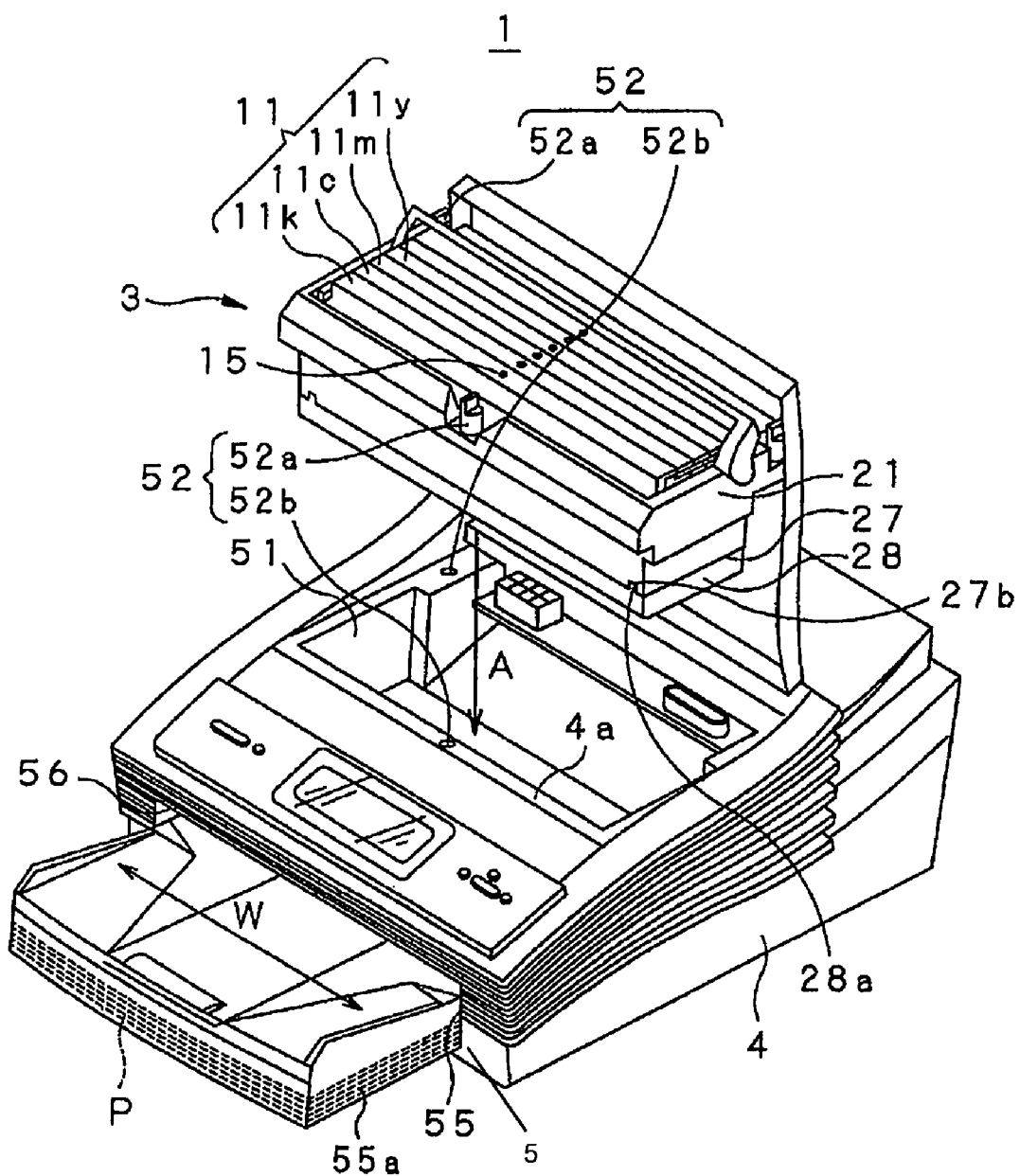
FIG. 1 is a perspective view of an ink jet printer according to the present invention.

The liquid composition, recording liquid, liquid spraying cartridge, and the liquid spraying apparatus and method according to the present invention will be described with reference to the ink jet printer (will be referred to as simply "printer" hereunder) shown in FIG. 1. The printer, generally indicated with a reference numeral 1, is to spray ink or the like as droplets to a recording paper P being carried in a predetermined direction to form images and characters on the paper P.

The printer 1 is a so-called line printer in which ink nozzles are arrayed across the printing width of the paper P in the direction of width of the paper P, that is, in a straight line in the direction of arrow W in FIG. 1.

Figure 2:
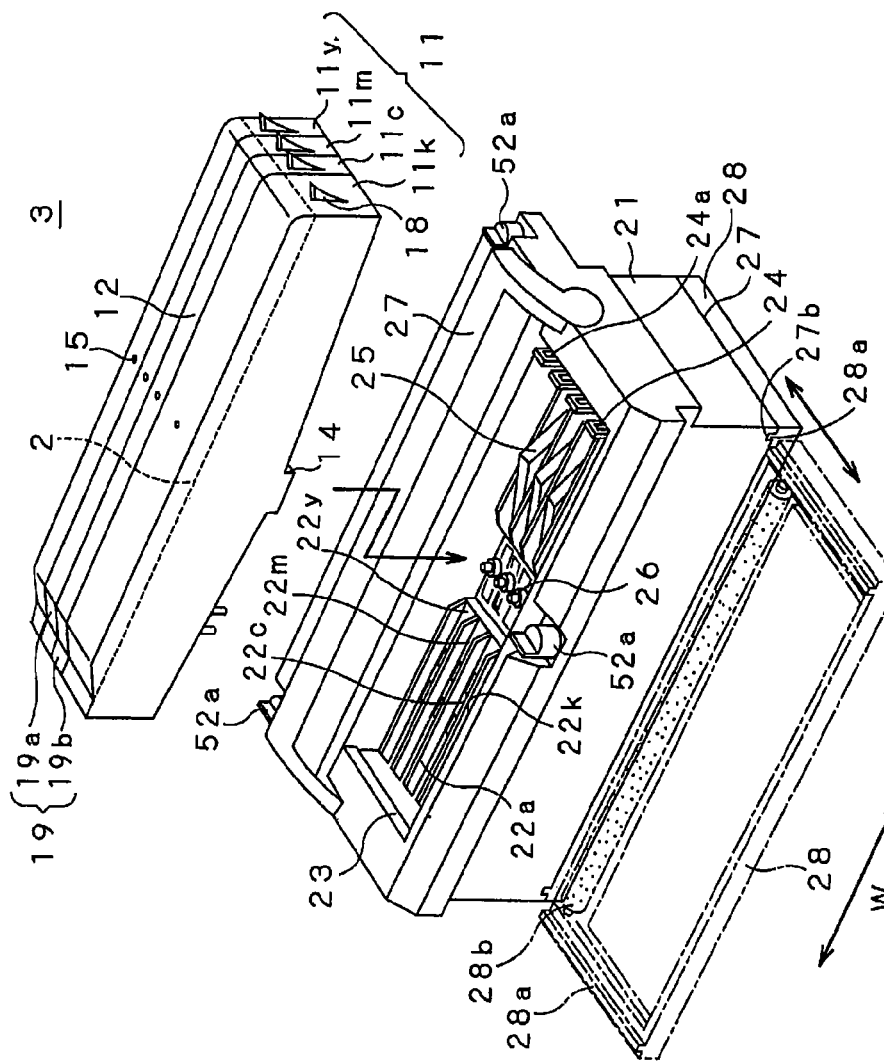
FIG. 2 is also a perspective view of an inkjet print head cartridge provided in the ink jet printer according to the present invention.
Figure 3:
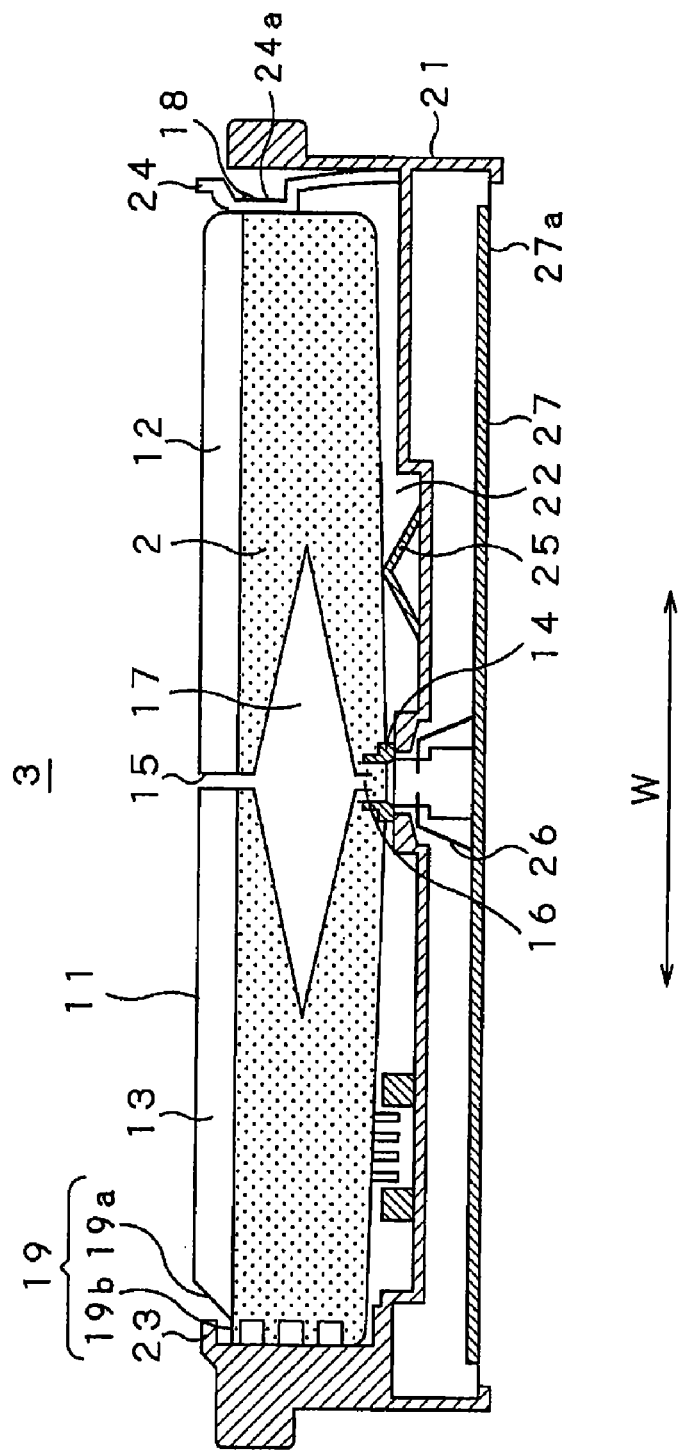
FIG. 3 is also a sectional view of the inkjet print head cartridge.

As shown in FIGS. 2 and 3, the printer 1 includes an ink-jet print head cartridge (will be referred to as "head cartridge" hereunder) 3 which sprays ink 2 as the recording liquid to form images and characters on the recording paper P, and a printer body 4 in which the head cartridge 2 is to be set.

In the printer 1, the head cartridge 3 is easily attached to and removed from the printer body 4, and ink cartridges 11*y*, 11*m*, 11*c* and 11*k* each containing the ink 2 and which supply the ink 2 to the head cartridge 3 are housed removably in the head cartridge 3.

In this printer 1, there are usable the ink cartridge 11*y* containing yellow ink 2, ink cartridge 11*m* containing magenta ink 2, ink cartridge 11*c* containing cyan ink 2 and ink cartridge 11*k* containing black ink 2. The head cartridge 3 which can be set removably in the printer body 4 and the ink cartridges 11*y*, 11*m*, 11*c* and 11*k* which can be housed removably in the head cartridge 3 are replaceable as consumables.

In this printer 1, the recording paper P received in stack in a paper tray 55*a* can be fed into the printer body 4 by setting the paper tray 55*a* in a tray housing 5 provided at the front bottom of the printer body 4. When the paper tray 55*a* is set in the tray housing 5 at the front of the printer body 4, the recording paper P is fed by a paper feed/eject mechanism 54 from a paper inlet 55 to the back of the printer body 4. Then a reverse roller 73 will reverse the moving direction of the recording paper P thus fed to the back of the printer body 4 and carry it above the forward path from the back to front of the printer body 4. The recording paper P being thus carried from the back to front of the printer body 4 will have printed thereon, as characters and images, printing data corresponding to character and image data supplied from an information processor 69 such as a personal computer until it is delivered from a paper outlet 56 provided at the front of the printer body 4.

The ink 2 as the recording liquid for printing is a mixture of, for example, colorants including a water-soluble pigment as a coloring matter and various pigments, a solvent in which the colorants are dispersed, a surface active agent to improve the dispersion of the colorants and a hydrophobic colloid which will be charged with a positive zeta potential when pH of the ink 2 is controlled to a range over 4 and under 6. It should be noted that the ink 2 is normally alkalescent so that metallic portions of head tips 43 which will be described in detail later will not be oxidized.

The colorants may be various dyes commonly used for recording by the ink jet printing, such as direct dye, acid dye, basic dye, reactive dye, disperse dye, vat dye, soluble vat dye, etc. which will be listed below.

More specifically, the yellow dye may be, for example, one or a mixture of more than one, selected from:

C.I. acid yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164 and 165;

C.I. direct yellow 1, 8, 11, 12, 24, 26, 27, 33, 39, 44, 50, 58, 85, 86, 87, 88, 89, 98, 110, 132, 142 and 144;

C.I. reactive yellow 1, 2, 3, 4, 6, 7, 11, 12, 13, 14, 15, 16, 17, 18, 22, 23, 24, 25, 26, 27, 37 and 42; and C.I. hood yellow 3, 4, etc.

The magenta dye may be, for example, one or a mixture of more than one, selected from:

C.I. acid red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321 and 422;

C.I. direct red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 321;

C.I. reactive red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; and C.I. hood red 7, 9, 14, etc.

The cyan dye may be, for example, one or a mixture of more than one, selected from:

C.I. acid blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236 and 249;

C.I. direct blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248 and 249;

C.I. reactive blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; and C.I. hood blue 1, 2, etc.

The black dye may be, for example, one or a mixture of more than one, selected from:

C.I. acid black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159 and 191;

C.I. direct black 17, 19, 22, 32, 38, 51, 56, 62, 71, 74, 75, 77, 94, 105, 106, 107, 108, 112, 113, 117, 118, 132, 133, 146, 154 and 168;

C.I. reactive black 1, 3, 4, 5, 6, 8, 9, 10, 12, 13, 14 and 18; and

C.I. hood black 2 etc.

The ink 2 has added thereto 0.5% to 15% by weight of the aforementioned colorants, or more preferably 0.7% to 10% by weight of the colorants. The density of the colorants depends upon the selected type of an object on which the ink 2 is printed and method of ink spraying. It should be noted that the lower the density of the colorants, the more easily the viscosity can be controlled and the more reliable the ink 2 having been stored for a long term is.

Also, pigment or the like may be used as the colorant. However, in case a pigment is used as the colorant, it will possibly have an influence on the zeta potential of the hydrophobic colloid which will be described in detail later. Therefore, a pigment used as the colorant should be used which will not adversely affect the zeta potential of the hydrophobic colloid.

The solvent in which the above-mentioned pigment etc. are dispersed may be, for example, a material, such as water or the like, which is low in viscosity, easy to handle, inexpensive and odorless. Also, as a solvent for the ink 2, there may be used ion-exchanged water, for example, to prevent unnecessary ion from mixing in the ink 2.

The ink 2 contains, in addition to the solvents such as water, ion exchanged water and the like, water-soluble organic solvent such as aliphatic monohydric alcohol, aliphatic polyhydric alcohol or derivative of aliphatic polyhydric alcohol.

More specifically, the aliphatic monohydric alcohol may be, for example, one or a mixture of more than one, selected from a lower-alcohol group including methyl alcohol, ethyl alcohol, n-propyl alcohol, i-propyl alcohol, n-butyl alcohol, s-butyl alcohol, t-butyl alcohol and the like.

With the use of the aforementioned aliphatic monohydric alcohol as the solvent, there is provided the ink 2 having an appropriate surface tension and excellent permeability to the recording paper P, dot-forming property and drying characteristic of the printed images. These excellent properties and characteristics of the ink 2 are assured by using, as the solvent, the ethyl alcohol, i-propyl alcohol or n-butyl alcohol selected from the group of aliphatic monohydric alcohol.

The aliphatic polyhydric alcohol may be, for example, one or a mixture of more than one, selected from an alkyleneglycol group including ethylene glycol, diethylene glycol, triethylene glycol, propylene glycol, butylene glycol and glycerol, a polyalkylene-glycol group including polyethylene glycol and polypropylene glycol, and thiodiglycol, for example.

The derivative of the aliphatic polyhydric alcohol may be, for example, one selected from a group of lower alkyl ether in the aforementioned aliphatic polyhydric alcohol, such as ethylene glycol dimethyl ether, and a group of lower carboxylate ester in the aforementioned aliphatic polyhydric alcohol, such as ethylene glycol diacetate. The aliphatic polyhydric alcohol and its derivative used as the solvent for the ink 2 makes the ink 2 not easy to dry and lowers the freezing point of the ink 2, thereby permitting to limit the change in properties of the ink 2 having been stored for a long term and the clogging of a nozzle 45a by the ink 2.

Therefore, by using, in addition to water or the like, one or a mixture of more than one, selected from the aliphatic monohydric alcohol, aliphatic polyhydric alcohol and derivative of the aliphatic polyhydric alcohol, as the solvents in which the dye and others are dispersed, it is possible to provide the ink 2 which meets the purpose of use and application.

Also the ink 2 may have added thereto, in addition to one or a mixture of more than one, selected from the aliphatic monohydric alcohol, aliphatic polyhydric alcohol and derivative of the aliphatic polyhydric alcohol, one or a mixture of more than one, selected from an amide group including dimethyl formaldehyde and dimethyl acetoamide, a ketone group including acetone and diacetone alcohol, a ketoalcohol group, a tervalent alcohol group including tetrahydrofuran, dioxane, γ-butyl lactone, glycerine and 1,2,6-hexane triol and nitrogenous heterocyclic compounds including diethanolamine, triethanolamine, sulforan, 2-pyrrolidine, N-methyl-2-pyrrolidine and 1,3-dimethyl-2-imidazolidinone. This addition will permit to improve the properties of the ink 2.

The ink 2 contains a surface active agent as the dispersion auxiliary for providing nearly uniform dispersion of the colorants. The surface active agent used in the ink 2 should preferably be a nonionic one, for example, but may be an anionic one.

The nonionic surface active agent is one or a mixture of more than one, selected from polyoxyethylene alkyl ether, polyoxyethylene alkyl ester, polyoxyethylene sorbitan fatty acid ester, polyoxyethylene alkyl phenyl ether, polyoxyethylene alkylamine, polyoxyethylene alkylamide and acetylene glycol.

Also, the ink 2 contains, in addition to the aforementioned colorants, solvent and surface active agent, a hydrophobic colloid which will be charged with a positive zeta potential when its pH is controlled to a range of over 4 and under 6.

Note that the term "zeta potential" used herein refers to part of the potential difference at the interface between the solid and liquid that effectively act on the electrokinetic phenomenon. More specifically, an electric double-layer is formed at the solid-liquid interface, and the distribution of potential in the ink 2 is such that when the liquid and solid move in relation to each other, the sticking layer will move together with the solid. The electrokinetic phenomenon depends upon the potential difference between the sticking layer and liquid. This potential difference is called "zeta potential".

Also, the term "hydrophobic colloid" used herein refers to a sol or the like which is carried by water. More specifically, it is a sol having a low affinity with water and whose dispersed particles are of metal, metal sulfide, metal hydroxide or the like.

More particularly, the hydrophobic colloid which will be charged with a positive zeta potential when the pH of the ink 2 is within a range of over 4 and under 6 is one or a mixture of more than one, selected from a metal oxide such as aluminum oxide, cerium oxide or the like and a metal sulfide such as barium sulfide.

Even when the ink 2 containing the predetermined hydrophobic colloid is in contact with a circuit board 44 in each of the head tips 43, formed from a silicon-containing material such as silicon wafer, the hydrophobic colloid which will be charged with a positive zeta potential when the pH of the ink 2 is within a range of over 4 and under 6 will adhere to the surface of the silicon-containing material such as silicon wafer which will be charged with a negative potential. Thus, it is possible to prevent silicon or silicon compound from being eluted from the silicon-containing material.

More specifically, since even the ink 2 being alkalescent becomes acidic around the silicon wafer from which silicon or silicon compound has been eluted, the hydrophobic colloid which will be charged with a positive zeta potential when the pH of the ink 2 is within a range of above 4 and under 6 will adhere to the silicon wafer which will be charged with a negative potential and limit the silicon or silicon compound from being further eluted from the silicon wafer into the ink 2.

Figure 4:
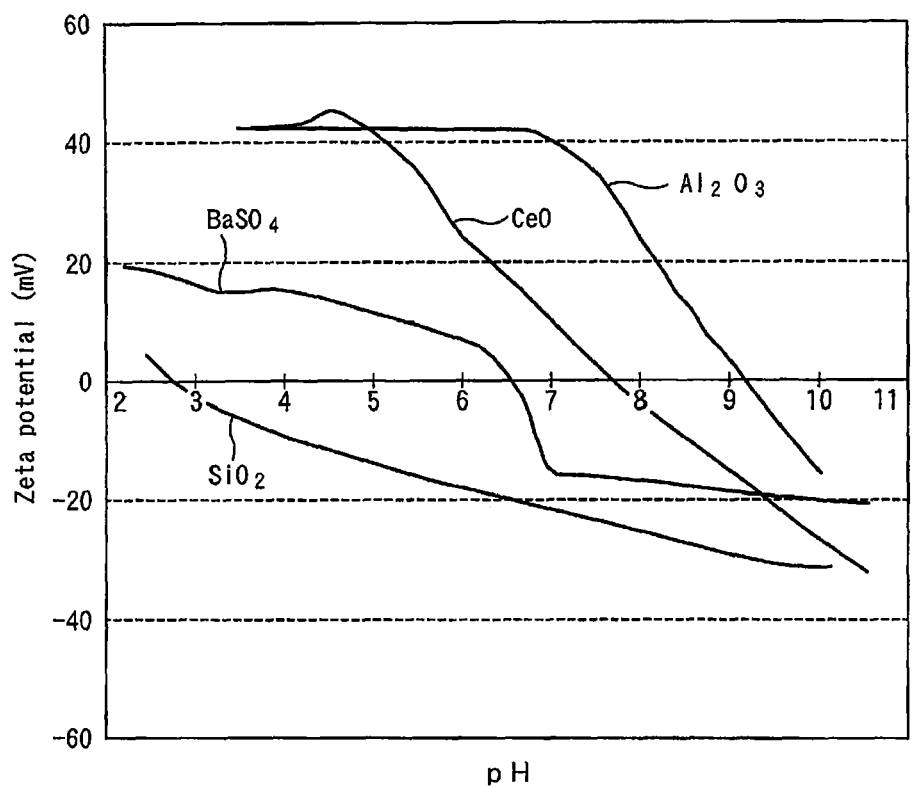
FIG. 4 shows characteristic curves showing the relation between the pH and zeta potential of a hydrophobic colloid.

Here, taking the aforementioned aluminum oxide ($Al_2O_3$), cerium oxide (CeO) and barium sulfide ($BaSO_4$) each as an example material of the hydrophobic colloid which will be charged with a positive zeta potential when the pH of the ink 2 is within a range of above 4 and under 6 while taking silica ($SiO_2$) as an example material of a hydrophobic colloid by which it is difficult to limit the silicon or silicon compound from being eluted from the silicon-containing material, the relation between the zeta potential when each of these hydrophobic colloids is dispersed in water and pH of this disperse medium will be explained with reference to the characteristic curves shown in FIG. 4.

The results of this experiment as shown in FIG. 4 reveals that the hydrophobic colloid using each of the aluminum oxide, cerium oxide and barium sulfide is charged with a positive zeta potential when the pH of the disperse medium is less than 6, and also that the hydrophobic colloid using the silica is not charged with any positive zeta potential when the pH of the disperse medium is not within the range of over 4 and under 6.

Thus, in the case of the hydrophobic colloid using the silica, even when the ink 2 becomes acidic around the silicon wafer after silicon or the like starts being eluted from the silicon wafer exposed to the alkalescent ink 2, for example, and the silicon or the like is continuously eluted without adhesion to the silicon wafer which is negatively charged. With the hydrophobic colloid using the silica, it is difficult to prevent silicon or silicon compound from being eluted from the silicon wafer.

On the other hand, in case the hydrophobic colloid uses the aluminum oxide, cerium oxide or barium sulfide, when the ink 2 becomes acidic around the silicon wafer after silicon or the like starts being eluted from the silicon wafer exposed to the alkalescent ink 2, for example, the colloid around the silicon wafer is appropriately charged with a positive zeta potential, adheres to the silicon wafer which is appropriately charged with a negative potential, and thus can appropriately prevent the silicon or silicon compound from being eluted from the silicon wafer.

The ink 2 contains the hydrophobic colloid within a range of above 3 ppm and under 10,000 ppm in relation to the ink 2, or more preferably within a range of above 10 ppm and under 1,000 ppm. Less than 3 ppm of the hydrophobic colloid in the ink 2 is so small that it difficult to limit the silicon or silicon compound from being eluted from the silicon-containing material such as a silicon wafer when the latter is exposed to the alkalescent ink 2.

The ink 2 may have further added thereto, in addition to the aforementioned colorants, solvent, surface active agent and predetermined hydrophobic colloid, a viscosity adjuster, surface tension adjuster, pH adjuster, antiseptic, fungicide and the like.

The viscosity adjuster and surface tension adjuster may be, for example, one or a mixture of more than one, selected from a protein group including gelatin, casein, etc., natural rubber such as gum arabic, a group of cellulose derivatives including as methyl cellulose, carboxymethyl cellulose, etc., a group of natural high polymers including lignosulfonic acid, shellac, etc., polyacrylic acid, styrene-acrylate copolymer salt, polyvinyl alcohol, polyvinyl pyrrolidone, etc.

The pH adjuster may be, for example, one selected from alkali metal hydroxides including lithium hydroxide, sodium hydroxide and potassium hydroxide, and amines including triethanolamine, diethanolamine, aminomethyl propanol, etc.

The antiseptic and fungicide may be, for example, one or a mixture of more than one, selected from sodium benzoate, sodium pentachlorophenolate, 2-pyridine thiol-1-oxide, sodium sorbate, sodium dehydroacetate, 1,2-dibenzothiazoline-3-on (any of PROXEL CRL, PROXEL BND, PROXEL GXL, PROXEL XL-2 and PROXEL TN by ABICIA), etc.

The ink 2 having the aforementioned composition is prepared as will be described below. A soluble type ink 2 using pigments as colorant can be prepared by mixing the aforementioned pigments as colorant, solvent, surface active agent and predetermined hydrophobic colloid, agitating and dispersing them by a screw or the like while heating them at 40 to 80° C.

Also, the dispersion type ink 2 using pigments as colorant can be prepared by dispersing the pigments along with the predetermined hydrophobic colloid into water having been made alkaline with any of sodium hydroxide, potassium hydroxide, lithium hydroxide, sodium carbonate, sodium hydrogen carbide, aqueous ammonia, triethanolamine, diethanolamine, triethylamine, aminomethylpropanol, etc. The dispersion is made by the conventional pigment fine-dispersion method and a disperser such as any one of a ball mill, sand mill, attritor, roll mill, agitator, Henschel mixer, colloid mill, ultrasonic homogenizer, per mill, wet jet mill, etc.

The ink 2 thus prepared is subjected to pressure or vacuum filtration by a filter at least once, to centrifugation by a centrifuge at least once, or to a combination of them in order to remove dusts coarse particles and other foreign matters.

The ink 2 is conditioned to have a surface tension of 30 to 60 mN/m or more preferably 30 to 40 mN/m, at a temperature of 25° C. in order to accommodate a higher speed printing, more particularly, to enable the resistance heater 42, which will be described in detail later, to be driven with a pulse current whose frequency is 1 kHz or more, preferably 3 kHz or more and more preferably 5 kHz or more. Also, the ink 2 is conditioned to have a viscosity lower than 15 mPa·s or more preferably lower than 5 mPa·s.

The yellow ink 2 is put in the ink cartridge 11y, magenta ink 2 is in the ink cartridge 11m, cyan ink 2 is in the ink cartridge 11c, and black ink 2 is in the ink cartridge 11k, as shown in FIGS. 2 and 3.

Next, the head cartridge 3 to be set removably in the printer body 4 included in the aforementioned printer 1 and the ink cartridges 11y, 11m, 11c ad 11k to be received removably in the head cartridge 3 will be described with reference to the accompanying drawings.

As shown in FIG. 1, the head cartridge 3 making print to the recording paper P is put into the printer body 4 from above, namely, in the direction of arrow A in FIG. 1, and sprays the ink 2 to the recording paper P being fed by the paper feed/eject mechanism 54 to form characters and images on the recording paper P.

The head cartridge 3 atomizes the ink 2 under a pressure produced by a pressure-producing means of an electrothermal transducing type or electromechanical transducing type, for example, and sprays the ink 2 as droplets onto the main surface of an object such as the recording paper P or the like. Here will be explained the atomizing and spraying of the ink 2 using the electrothermal transducing type pressure-producing means by way of example.

As shown in FIGS. 2 and 3, the head cartridge 3 includes a cartridge body 21 in which the ink cartridges 11y, 11m, 11c and 11k each containing the ink 2 is received. It should be noted that the ink cartridges 11y, 11m, 11c and 11k will generically be referred to simply as "ink cartridge 11" hereunder.

The ink cartridge 11 received removably in the head cartridge 3 includes a cartridge type container 12 formed by injection molding of a resin material having a sufficient strength and ink resistance, such as polypropylene or the like. The cartridge type container 12 is formed to have a generally rectangular shape having the nearly same size as the width of the recording paper P which is to be fed longitudinally. This rectangular shape maximizes the volume of the ink filled in the container 12.

More particularly, the cartridge type container 12 included in the ink cartridge 11 includes an ink container 13 in which the ink 2 is filled, an ink dispenser 14 to supply the ink 2 from the ink container 13 to the cartridge body 21 of the head cartridge 3, an outside communication hole 15 to take air from outside into the ink container 13, an air inlet channel 16 to introduce the air taken in through the outside communication hole 15 into the ink container 13, an ink trap 17 formed between the outside communication hole 15 and air inlet channel 16 to provisionally store the ink 2, and a locking projection 18 and engagement step 19 to lock the ink cartridge 11 to the cartridge body 21.

The ink container 13 is formed from a highly airtight material to define a space in which the ink 2 is filled. The ink container 13 is formed to have a generally rectangular shape and have a length generally equal to the width W of the recording paper P to be fed longitudinally, as shown in FIG. 3.

The ink dispenser 14 is provided nearly in the lower center of the ink container 13. The ink dispenser 14 is generally a projecting nozzle communicating with the ink container 13. The free end of the nozzle is fitted into a connector 26 of the head cartridge 3, which will be described in detail later, to provide a coupling between the cartridge type container 12 of the ink cartridge 3 and the cartridge body 21 of the head cartridge 2. The ink 2 is supplied from the ink cartridge 11, which contains the ink 2, to the cartridge body 21 via the ink dispenser 14.

As shown in FIG. 3, the outside communication hole 15 is a vent hole through which air is taken into the ink container 13 from outside the ink cartridge 11. It is formed on the top of the cartridge type container 12, more precisely, nearly in the top center of the cartridge type container 12, where the hole 15 is exposed to outside when the ink cartridge 11 is housed in a cartridge receptacle 22 of the head cartridge 3, so that air can be taken in from the outside.

When the ink cartridge 11 is set in the cartridge body 21 and the ink 2 flows down from the ink container 13 to the cartridge body 21, an amount of air corresponding to a reduced amount of the ink 2 in the ink container 13 is taken from outside into the ink cartridge 11 through the outside communication hole 15.

The air inlet channel 16 provides communication between the ink container 13 and outside communication hole 15 to introduce the air taken in through the outside communication hole 15 into the ink container 13. When the ink cartridge 11 is set in the cartridge body 21, the ink 2 is supplied to the cartridge body 21 of the head cartridge 3 so that the amount of ink 2 in the ink container 13 will fall correspondingly and the internal pressure in the ink container 13. However, the air introduced into the ink container 13 through the air inlet channel 16 as above will keep the internal pressure in such a normal balance that the ink 2 can appropriately be dispensed to the cartridge body 21.

The ink trap 17 is provided between the outside communication hole 15 and air inlet channel 16. It is intended for provisional stay of the ink 2, if any, leaking out of the air inlet channel 16 communicating with the ink container 13 to prevent the leaked ink 2 from flowing out suddenly. The ink trap 17 is formed to have a nearly rhombic section whose longer diagonal extends longitudinally of the ink container 13. The air inlet channel 16 is provided at the lower apex of the rhombic section, positioned at the bottom of the ink container 13, that is, at the lower end of the shorter diagonal of the rhombic section, so that the ink 2 having come from the ink container 13 can be returned back to the ink container 13. Also, since the outside communication hole 15 is provided at the lower apex of the rhombic section, namely, at the lower end of the shorter diagonal, the ink trap 17 prevents the ink 2 having come from the ink container 13 from easily leaking out from the outside communication hole 15.

The locking projection 18 is formed on one longitudinal end of the ink cartridge 11. It is engaged in an engagement hole 24a formed in a latch lever 24 of the cartridge body 21 of the head cartridge 3. The locking projection 18 has the upper side thereof formed to be nearly perpendicular to the lateral side of the ink container 13 and the lower side formed to be oblique from the lateral side toward the upper side.

The engagement step 19 is formed on the other longitudinal end of the ink cartridge 11, opposite to the one longitudinal end of the ink cartridge 11 where the engagement projection 18 is formed. The engagement step 19 includes a slope 19a contiguous at one end thereof to the top of the cartridge type container 12 and a horizontal surface 19b formed between the other end of the slope 19a and the other longitudinal end of the ink cartridge 11 and extending in parallel with the top of the cartridge type container 12. Because of the engagement step 19 thus provided, the horizontal surface 19b is one step lower than the top of the cartridge type container 12 and the ink cartridge 11 is engaged at the engagement step 19 with a retainer 23 of the cartridge body 21. As above, the engagement step 19 is provided at the insertion end of the ink cartridge 11. With the engagement step 19 placed under the retainer 23 of the cartridge receptacle 22 in the head cartridge 3, the ink cartridge 11 is set into the cartridge receptacle 22 in the head cartridge 3. That is, the engagement step 19 serves as a pivot when setting or removing the ink cartridge 11 into or from the cartridge receptacle 22.

The ink cartridge 11 constructed as above includes, in addition to the above-mentioned components, an ink-remainder detector for detecting the amount of the ink 2 remaining in the ink container 13, identification unit for identifying the ink cartridges 11y, 11m, 11c and 11k, etc., for example.

Here will be illustrated and described the head cartridge 3 constructed as above and in which there are housed the ink cartridges 11y, 11m, 11c and 11k containing ink 2 in yellow, magenta, cyan and black, respectively.

As shown in FIGS. 2 and 3, the head cartridge 3 includes the aforementioned ink cartridge 11 and cartridge body 21, and the cartridge body 21 includes receptacles 22y, 22m, 22c and 22k (will be referred to simply as "receptacle 22" hereunder when they are generically referred to) in which the ink cartridges 11y, 11m, 11c and 11k are set, respectively, the retainer 23 and latch lever 24 for retaining the ink cartridge 11, a forcing member 25 to force the ink cartridge 11 in a direction in which the ink cartridge 11 is to be removed, a coupling 26 connected to the ink dispenser 14 and which is supplied with the ink 2 from the ink dispenser 14, an ink-spraying head 27 to spray the ink 2 as droplets, and a head cap 28 to protect the ink-spraying head 27.

Each receptacle 22 for receiving the ink cartridge 11 is formed to have a generally concave shape open at the top for receiving and removing the ink cartridge 11. The four ink cartridges 11 are received in these receptacles 22, respectively, side by side in a direction generally perpendicular to the direction of width of the recording paper P, namely, in the moving direction of the recording paper P. The receptacle 22 extends longitudinally in the printing direction similarly to the ink cartridge 11 because the latter is set in the receptacle 22. The ink cartridge 11 is received in the cartridge body 21.

The receptacle 22 receives the ink cartridge 11 as shown in FIG. 2. The receptacle 22y receives the yellow-ink cartridge 11y, receptacle 22m receives the magenta-ink cartridge 11m, receptacle 22c receives the cyan-ink cartridge 11c and receptacle 22k receives the black-ink cartridge 11k. The receptacles 22y, 22m, 22c and 22k are isolated from each other by partitions 22a.

As best shown in FIG. 3, the retainer 23 overhangs from the one longitudinal end of the receptacle 22 and retains the engagement step 19 formed on the ink cartridge 11. The ink cartridge 11 can be set in the receptacle 22 by inserting the ink cartridge 11 obliquely into the receptacle 22 with the engagement step 19 being directed downward and turning down the longitudinal end, opposite to the engagement step 19, of the ink cartridge 11 toward the receptacle 22 about the point of engagement of the engagement step 19 and retainer 23. Thus, the ink cartridge 11 can easily be set in the receptacle 22.

The latch lever 24 is formed from a leaf spring by bending. It is provided at the end of the receptacle 22 opposite to the retainer 23, namely, at the other longitudinal end of the receptacle 22. The latch lever 24 is fixed at the base end thereof integrally to the lateral bottom of the other longitudinal end of the receptacle 22. The free end of the latch lever 24 is elastically movable in a direction toward and away from the lateral side of the receptacle 22. A locking hole 24a is formed in the free end portion of the latch lever 24. Upon setting of the ink cartridge 11 in the receptacle 22, the latch lever 24 will elastically be moved, and the locking projection 18 of the ink cartridge 11 is engaged in the locking hole 24a so that the ink cartridge 11 set in the receptacle 22 will not be disengaged from the receptacle 22.

The forcing member 25 is formed from a leaf spring by bending, and provided on the bottom of the receptacle 22 at the side opposite to the engagement step 19 of the ink cartridge 11. It forces the ink cartridge 11 in a direction in which the ink cartridge 11 is to be removed. The forcing member 25 has an apex formed by bending. The apex moves in a direction toward and away from the bottom of the receptacle 22. The forcing member 25 is an ejecting member to force the bottom of the ink cartridge 11 by the apex thereof in a direction in which the ink cartridge 11 is removed from the receptacle 22. When the locking projection 18 is disengaged from the locking hole 24a in the latch lever 24, the forcing member 25 ejects the ink cartridge 11 from inside the receptacle 22.

Each of the receptacles 22y, 22m, 22c and 22k has formed nearly in the longitudinal center the coupling 26 to which the ink dispenser 14 of each of the ink cartridges 11y, 11m, 11c and 11k is connected when the ink cartridges 11y, 11m, 11c and 11k are set in the receptacles 22y, 22m, 22c and 22k, respectively.

The coupling 26 serves as an ink supply channel through which the ink 2 is supplied from the ink dispenser 14 of the ink cartridge 11 set in the receptacle 22 to the ink-spraying head 27 provided on the bottom of the cartridge body 21.

Figure 5:
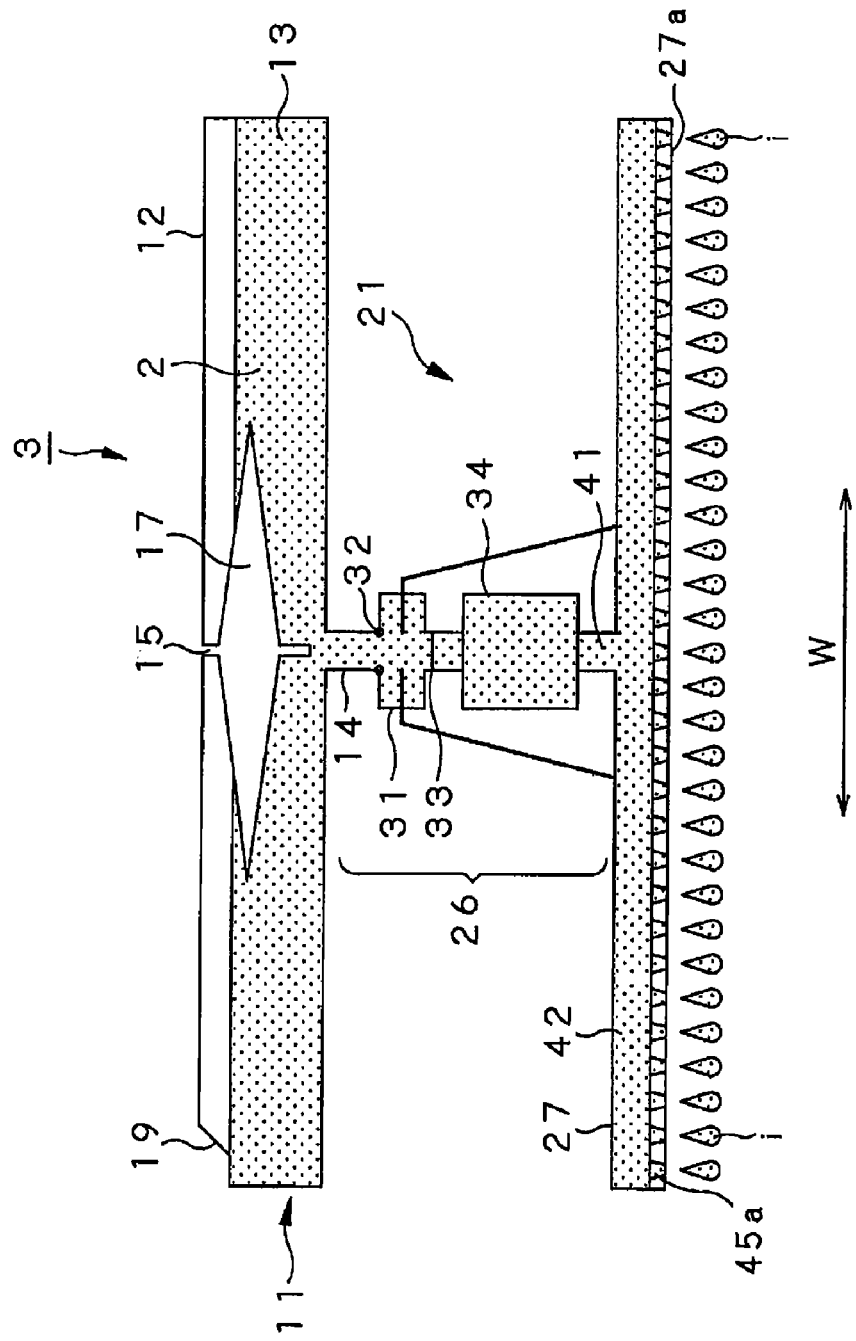
FIG. 5 schematically illustrates the relation between an ink cartridge and body of the ink-jet print head cartridge.

More specifically, the coupling 26 includes, as shown in FIG. 5, an ink well 31 in which the ink 2 supplied from the ink cartridge 11 stays, a sealing member 32 to seal the ink dispenser 14 connected to the coupling 26, a filter 33 to remove impurities in the ink 2, and a valvular mechanism 34 to open and close the supply channel to the ink-spraying head 27.

The ink well 31 is a space connected to the ink dispenser 14 and in which the ink 2 supplied from the ink cartridge 11 stays.

The sealing member 32 is provided at the upper end of the ink well 31. When the ink dispenser 14 of the ink cartridge 11 is connected to the ink well 31 of the coupling 26, the sealing member 32 provides sealing between the ink well 31 and ink dispenser 14 to prevent the ink 2 from leaking out.

The filter 33 removes dusts or the like mixed in the ink 2 when the ink cartridge 11 is set or removed. It is provided downstream of the ink well 31.

When the ink 2 is sprayed out of the ink-spraying head 27 and the pressure of the ink 2 in the ink-spraying head 27 falls, the valvular mechanism 34 closes to allow the ink cartridge 11 to supply the ink 2 to the ink-spraying head 27 so that the pressure of the ink 2 in the ink-spraying head 27 is kept nearly constant. On the other hand, when the ink 2 is supplied from the ink cartridge 11 to the ink-spraying head 27 and the pressure of the ink 2 in the ink-spraying head 27 becomes nearly constant, the valvular mechanism 34 opens to inhibit the ink cartridge 11 from supplying the ink 2 any more to the ink-spraying head 27.

Also, in the coupling 26 constructed as above, when the ink 2 is supplied from the ink cartridge 11 to the ink-spraying head 27, the pressure of the ink 2 in the ink container 13 falls while external air enters the ink cartridge 11 through the air inlet channel 16. The air having entered the ink cartridge 11 is sent to above the ink cartridge 11. Thus, the state before the ink 2 is sprayed as droplets i from the nozzle 45a which will further be described later and a state of equilibrium is established. The equilibrium state is such that little ink 2 exists in the air inlet channel 16.

As shown in FIG. 5, the ink-spraying head 27 is disposed along the bottom of the cartridge body 21. In the ink-spraying head 27, the nozzles 45a to spray the ink 2 supplied from the coupling 26 as ink droplets i are arrayed for each of the ink colors across the width of the recording paper P, that is, in a nearly straight line in the direction of arrow W in FIG. 5.

The head cap 28 is a cover provided to protect the ink-spraying head 27 as shown in FIG. 2. When printing is done, the head cap 28 is retreated from the ink-spraying head 27. The head cap 28 includes a pair of engagement projections 28a formed along the opposite ends in the direction of arrow W in FIG. 2, that is, in the moving direction of the head cap 28, and a cleaning roller 28b provided longitudinally of the head cap 28 to absorb excessive ink 2 adhering to a spraying surface 27a of the ink-spraying head 27. With the engagement projections 28a being engaged in a pair of engagement recesses 27b formed in the spraying surface 27a of the ink-spraying head 27 in a direction nearly perpendicular to the direction of arrow W in FIG. 2, the head cap 28 is movable (in the closing/opening direction) laterally of the ink cartridge 11 along the pair of engagement recesses 27b, that is, in the direction generally perpendicular to the direction of arrow W in FIG. 2. As the head cap 28 is moved in the closing/opening direction), the cleaning roller 28b is driven to rotate in contact with the spraying surface 27a of the ink-spraying head 27 and clean the spraying surface 27a of the ink-spraying head 27 by absorbing excessive ink 2 from the spraying surface 27a. The cleaning roller 28b is made of a highly hygroscopic material, more specifically, sponge, nonwoven fabric, woven fabric or the like. Also, when no printing is made, the head cap 28 covers the spraying surface 27a to prevent the ink 2 in the ink-spraying head 27 from evaporating.

As shown in FIG. 5, the ink-spraying head 27 includes an ink outlet 41 located above the spraying surface 27a through which the ink 2 is supplied from the aforementioned ink dispenser 14, and an ink channel 42 to guide the ink 2 supplied through the ink outlet 41 to each of the nozzles 45a.

The ink outlet 41 is provided in the top center of the ink channel 42 and communicates with the aforementioned valvular mechanism 34.

The ink channel 42 is form in a generally straight line along a length equivalent to the width of the recording paper for the ink 2 to be supplied to each of the nozzles 45a.

Figure 6:
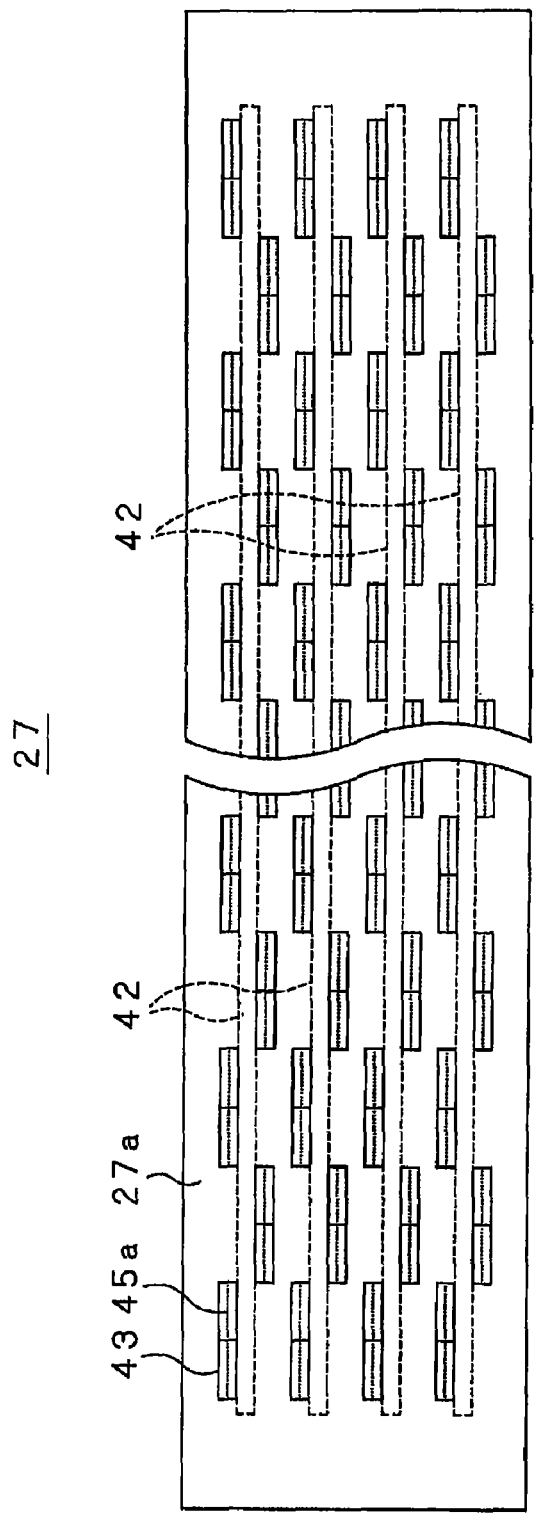
FIG. 6 is a plan view of the spraying surface of the inkjet print head cartridge.

In the ink-spraying head 27, the head tips 43 each having formed therein a predetermined number of nozzles 45a which will be described in detail later are disposed in a zigzag manner for each ink color. That is, for each ink color, the head tips 43 are arranged in staggered arrays with the ink channel 42 being laid between them in the direction of width of the recording paper P as shown in FIG. 6.

Figure 7:
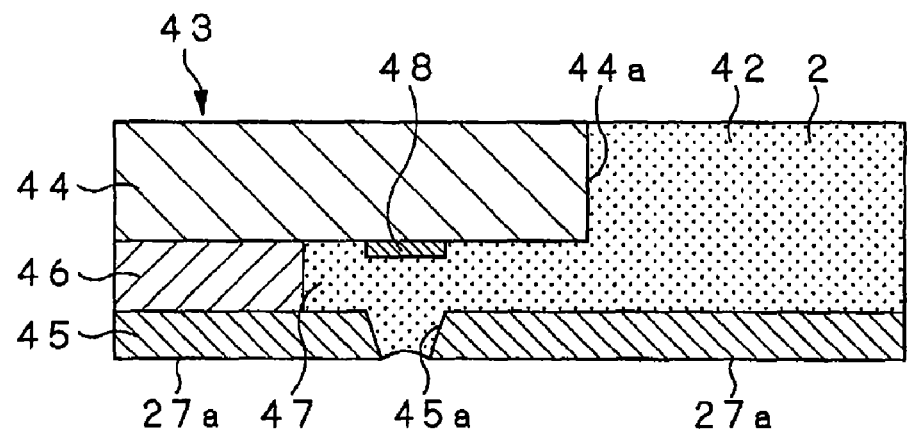
FIG. 7 is a schematic sectional view of a heat tip of the inkjet print head cartridge.

As shown in FIG. 7, the head tip 43 includes a circuit board 44 as a base, a nozzle sheet 45 having a plurality of nozzles 45a formed therein, a film 46 providing an isolation between the circuit board 44 and nozzle sheet 45 for each nozzle 45a, an ink chamber 47 in which the ink 2 supplied through the ink channel 42 is pressurized, and a resistance heater 48 to heat the ink 2 supplied to the ink chamber 47.

The circuit board 44 includes a substrate formed from a silicon-containing material such as silicon wafer, glass substrate or the like and having formed thereon a control circuit formed from a logic IC (integrated circuit), driver transistor and the like. The upper surface of the ink chamber 47 and lateral end face 44a of the circuit board 44 form part of the ink channel 42. That is, the circuit board 44 is a semiconductor circuit board.

The nozzle sheet 45 has formed therein the nozzle 45a reduced in diameter as it goes toward the ink-spraying surface 27a, and is disposed opposite to the circuit board 44 with the film 46 being laid between them to form the bottom of the ink chamber 47.

The film 46 is a photo-curable dry film resist, for example. It is formed around each nozzle 45a except for a portion communicating with the aforementioned ink channel 42. Also, the film 46 is interposed between the circuit board 44 and nozzle sheet 45 to form the lateral side of the ink chamber 47.

The ink chamber 47 is surrounded by the aforementioned circuit board 44, nozzle sheet 45 and film 46 to form, for each nozzle 45a, a pressurizing space in which the in 2 supplied from the ink channel 42 is pressurized.

The resistance heater 48 is disposed on the circuit board 44 facing the ink chamber 47 and is electrically connected to the control circuit on the circuit board 44. The resistance heater 48 generates heat under the control of the control circuit and the like to heat the ink 2 in the ink chamber 47.

In the head tip 43, the control circuit on the circuit board 44 selects one of the resistance heaters 48 and supplies a pulse current to the selected resistance heater 48 for a time length of about 1 to 3 microseconds, for example.

Thus, the resistance heater 48 is rapidly heated. Then, a bubble is produced in the ink 2 in the ink chamber 47 being in touch with the resistance heater 48. In the ink chamber 47, the bubble will be inflated to pressurize the ink 2 and the ink 2 thus pressed be sprayed as a droplet from the nozzle 45a. After the droplet of the ink 2 is sprayed as above, the ink 2 is supplied to the ink chamber 47 through the ink channel 42. Thus, the ink chamber 47 will restore the state which is before the ink 2 is sprayed.

Figure 8:
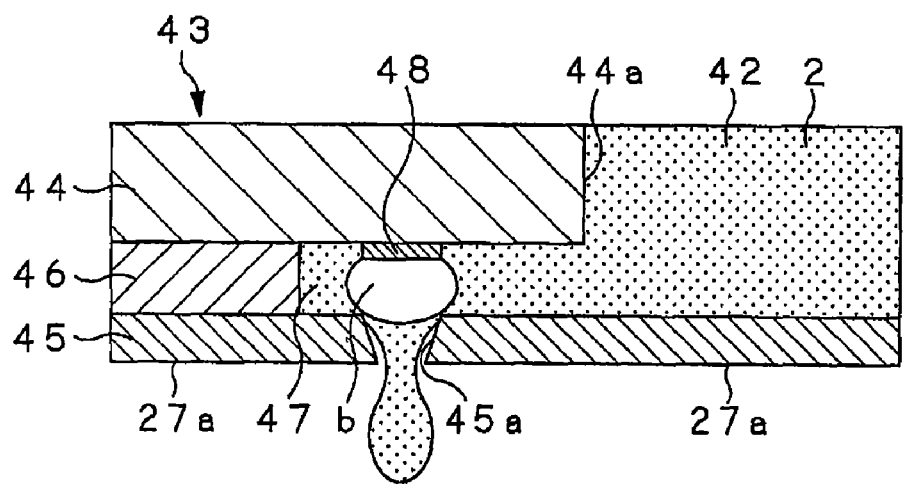
FIG. 8 is a sectional view explaining how the head tips spray ink droplets and showing an ink bubble formed in the ink chamber.

More particularly, when the ink 2 is rapidly heated by the resistance heater 48, the temperature of the ink 2 will rapidly rise over the boiling point. Then, when the ink 2 is further heated up to about 300° C. and arrives at the spontaneous nucleation temperature, an ink bubble b will momentarily take place on the resistance heater 48. Then, in the ink chamber 47, excessive energy in the ink 2 will be released at once and the internal pressure of the ink bubble b rise as shown in FIG. 8.

Figure 9:
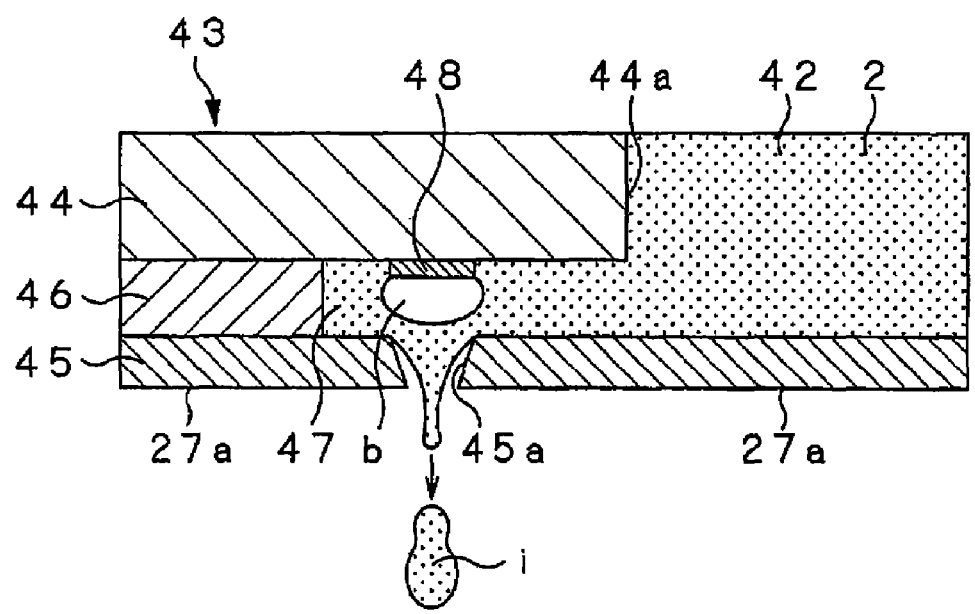
FIG. 9 is also a sectional view explaining how the head tips spray ink droplets and showing the ink droplet sprayed from the nozzle under the pressure of the ink bubble.

Then, the ink bubble b will suddenly be inflated. The ink 2 in the ink chamber 47 will spring out under the pressure of the inflating ink bubble b and the ink bubble b will be depressurized because of its inflation and thus shrink as shown in FIG. 9. The ink 2 having sprung out from the nozzle 45a will have its tail extending out of the nozzle 45a cut due to its inertia and shrinkage of the ink bubble b. That is, the ink 2 is sprayed as a droplet i from the nozzle 45a.

The ink bubble b in the ink chamber 47 is broken on the resistance heater 48. Then, the ink chamber 47 will be supplied with the ink 2 in the same amount as that sprayed from the nozzle 45a from the ink dispenser 42 under the effect of the capillary attraction of the nozzle 45a going to recover its initial meniscus (liquid surface on the nozzle 45a). Thus, the ink droplet i is sprayed from the nozzle 45a of the head tip 43.

The head tip 43 is formed by forming the film 46 over the main surface of the circuit board 44, shaping the film 46 into a form corresponding to the ink chamber 47 by the photolithography, and then laminating the nozzle sheet 45 on the film 46 so formed. Also, the head tip 43 adopts an electrothermal transducing process in which the ink 2 is sprayed while being heated by the resistance heater 48. However, the head tip 43 may not adopt such a process but may adopt an electromechanical transducing process in which a droplet of the ink 2 is sprayed electromechanically by an electromechanical transducing element such as piezoelectric element, for example.

The ink-spraying head 27 is provided under the aforementioned ink dispenser 14 for each color. On the bottom of the cartridge body 21, the ink-spraying surfaces 27a of the ink-spraying head 27 for different ink colors are arranged side by side along the short side of the cartridge body 21 to form successive ink-spraying surfaces 27a. Namely, the head cartridge 3 includes a so-called multi-line head in which the ink-spraying heads 27 for the different ink colors are joined to each other to form the successive ink-spraying surfaces 27a. The ink-spraying head 27 has provided on the ink-spraying surface 27a thereof about 100 to 5,000 nozzles 45a for each color, and a total of about 400 to 20,000 nozzles 45a. Also, this ink-spraying head 27 can spray the ink 2 at a rate as high as about 1/7,000 sec from each of the nozzles 45a.

In the head tip 43 of the ink-spraying head 27 constructed as above, the main surface and other portions of the circuit board 44 where the resistance heater 48 etc. are provided can easily be treated by oxidization, for example. Owing to this surface treatment, even when the main surface of the circuit board 44 is exposed to the alkaline ink 2, silicon or the like will not be eluted into the ink 2 from the circuit board 44. However, since the silicon-containing material such as the silicon wafer cut by dicing or the like is exposed to the ink 2 at the lateral edge 44a of the circuit board 44 forming part of the ink channel 42, silicon or silicon compound will possibly be eluted from the lateral edge 44a of the circuit board 44 into the ink 2, if the latter is alkaline.

Figure 10:
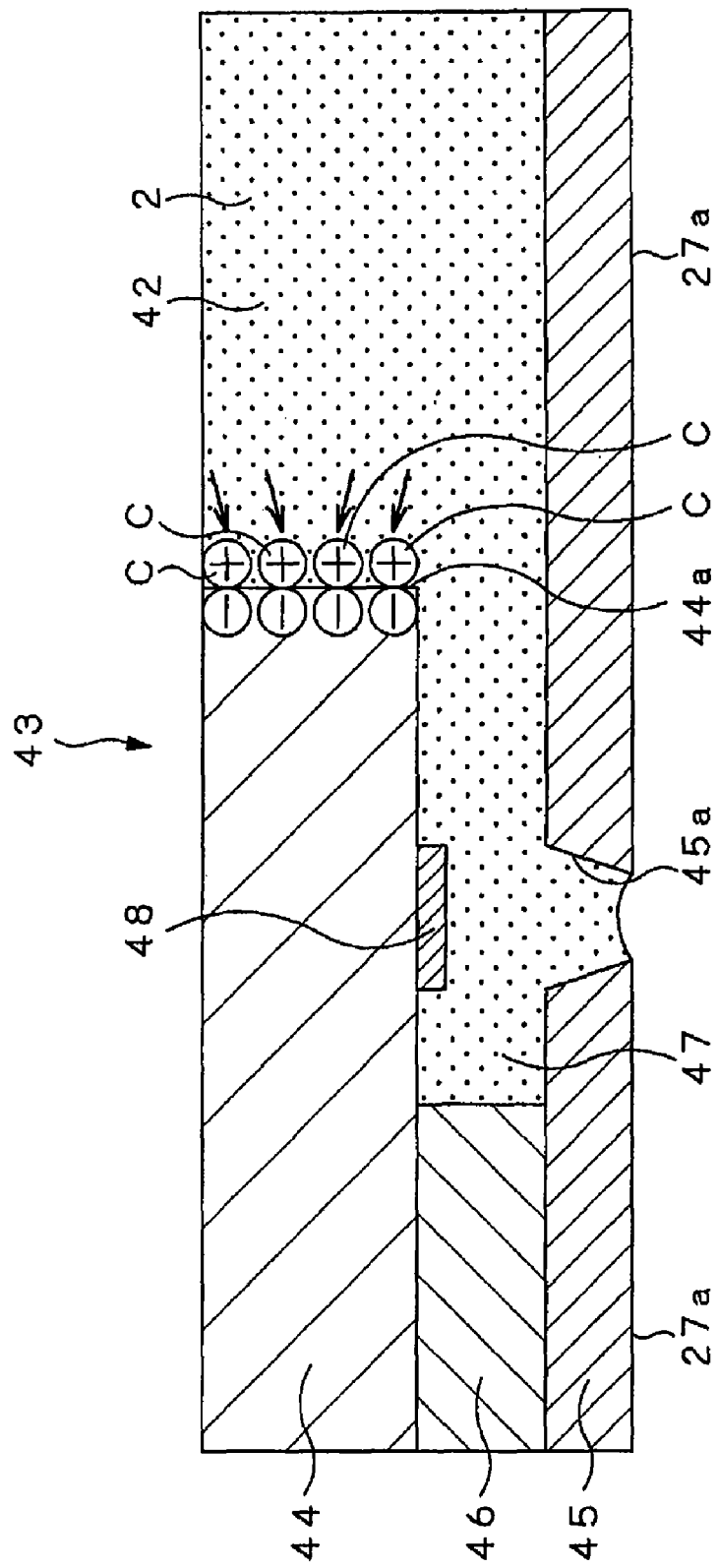
FIG. 10 is a schematic sectional view showing a hydrophobic colloid adhering to the end face of a circuit board in the head tip.

In this head tip 43, however, since the ink 2 contains a hydrophobic colloid which is charged with a positive zeta potential when the pH of the ink 2 is within a range of over 4 and under 6, silicon will start being eluted from the lateral edge 44a of the circuit board 44 exposed to alkalescent ink 2, for example. When the ink 2 is acidic around the circuit board 44, the hydrophobic colloid will be charged with a positive zeta potential and adhere to a portion of the circuit board 44, negatively charged, where the silicon-containing material of the circuit board 44 is exposed, namely, to the lateral edge 44a of the circuit board 44. The above is illustrated in FIG. 10.

Thus, the silicon or silicon compound will be prevented from being further eluted into the ink 2. It should be noted that in FIG. 10, the hydrophobic colloid positively charged is indicated with a reference symbol C.

Therefore, in this head tip 43, even if the alkaline ink 2 has been left in the ink channel 42 and ink chamber 47 for a long term, silicon or the like will not be eluted from the circuit board 44. Namely, it is possible to prevent the silicon or silicon compound having been eluted from the circuit board 44 from being deposited on the resistance heater 48, namely, to prevent the so-called "cogation". Also, it is possible to prevent the silicon or silicon compound having been eluted from the circuit board from being deposited in the nozzle 45a, ink channel 42 and the like, namely, to prevent "clogging" of the nozzle 45a, ink channel 42 and the like.

That is to say, in the head cartridge 3 having been explained above, when the alkalescent ink 2, for example, is sprayed from the ink-spraying head 27, silicon, silicon compound or the like is prevented from being eluted into the ink 2 from the circuit board 44, thereby preventing the "cogation" from occurring on the resistance heater 48 and silicon or silicon compound from being deposited to clog the nozzle 45a. Thus, it is possible to prevent the spraying performance from being deteriorated and ink from being not sprayed.

Next, there will be illustrated and described the printer body 4 of the printer 1 in which the aforementioned head cartridge 3 is to be installed.

Figure 11:
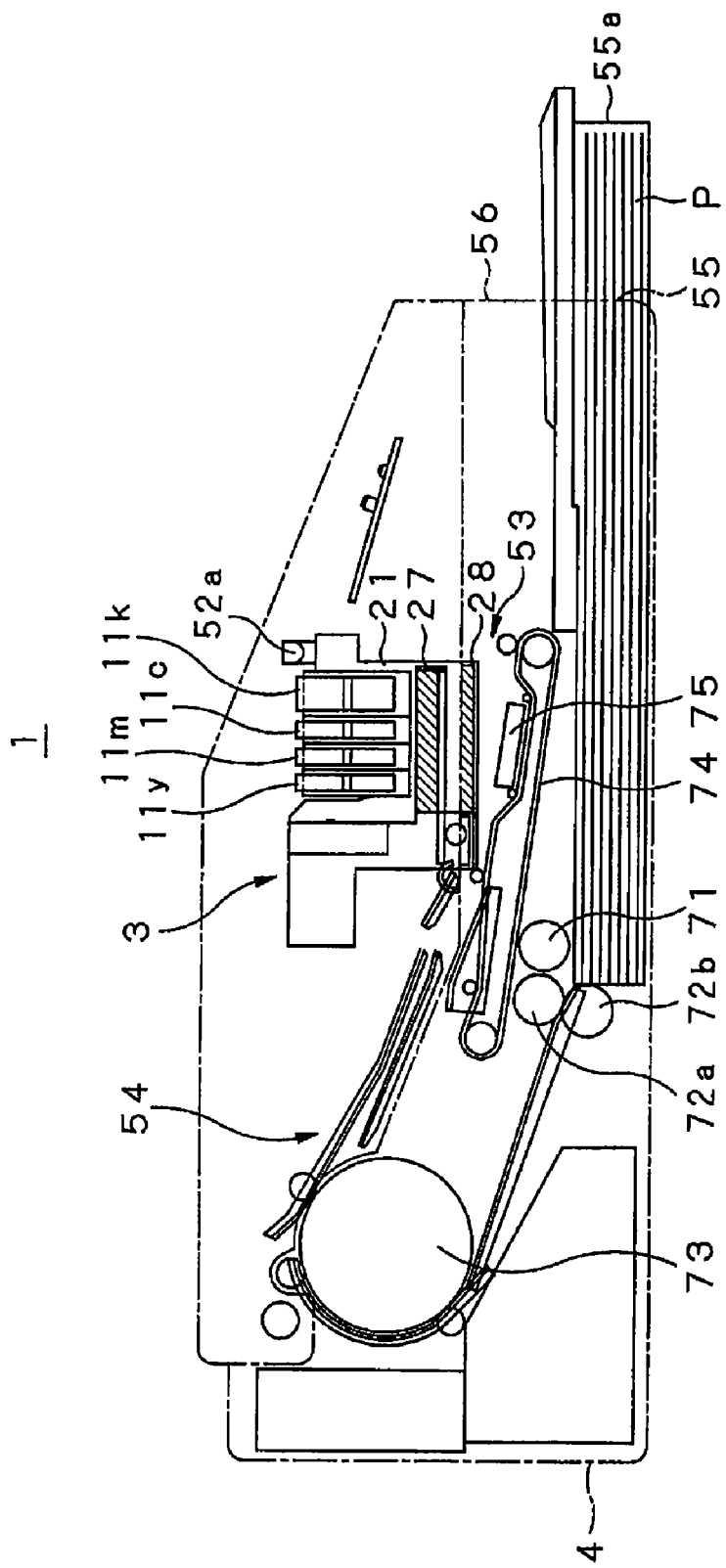
FIG. 11 is a schematic see-through side elevation of part of the ink jet printer.

As shown in FIGS. 1 and 11, the printer body 4 includes a head cartridge receptacle 51 in which the head cartridge 3 is received, a head cartridge retaining mechanism 52 for retaining the head cartridge 3 in the head cartridge receptacle 51, a head cap operating (closing/opening) mechanism 53 to open and close the head cap, a paper feeding/ejecting mechanism 54 to feed and eject the recording paper P, a paper inlet 55 to supply the recording paper P to the paper feed/eject mechanism 54, and a paper outlet 56 to deliver the recording paper P from the paper feed/eject mechanism 54.

The head cartridge receptacle 51 is a concavity for receiving the head cartridge 3. The head cartridge 3 is received in the receptacle 51 so that the ink-spraying surface 27a of the ink-spraying head 27 and the surface of the moving recording paper P are nearly parallel to each other in order to make printing to the moving recording paper P according to given data. The head cartridge 3 has to be replaced because of clogging in the ink-spraying head 27 in some cases. Although it should not be replaced so frequently as the ink cartridge 11, it is also a consumable and thus removably retained by the head cartridge retaining mechanism 52 in the head cartridge receptacle 51.

The head cartridge retaining mechanism 52 is to retain the head cartridge 3 removably in the head cartridge receptacle 51 as above. With a knob 52a provided on the head cartridge 3 being hooked on a forcing member such as a spring (not shown) provided inside an engagement hole 52b in the printer body 4, the head cartridge 3 can be held and retained in a position where it is forced to a reference surface 4a on the printer body 4.

The head cap operating mechanism 53 includes a drive to open and close the head cap 28 of the head cartridge 3. When making printing, the head cap operating mechanism 53 opens the head cap 28 to expose the ink-spraying surface 27a of the ink-spraying head 27 to the recording paper P. When the printing is over, the head cap operating mechanism 53 closes the head cap 28 to protect the ink-spraying head 27.

The paper feed/eject mechanism 54 includes a drive to carry the recording paper P. It carries the recording paper P fed from the paper inlet 55 to the ink-spraying head 27 of the head cartridge 3, and also the same recording paper P having ink droplets i sprayed thereon from the nozzles 45a to have images or characters formed thereon to the paper outlet 56, and ejects it to outside the printer 1.

The paper inlet 55 is an opening through which the recording paper P is fed to the paper feed/eject mechanism 54. A plurality of sheets of recording paper P can be stocked being stacked in the paper tray 55a. The paper outlet 56 is an opening through which the recording paper P having been printed with the ink droplets i is delivered to outside the printer 1.

Figure 12:
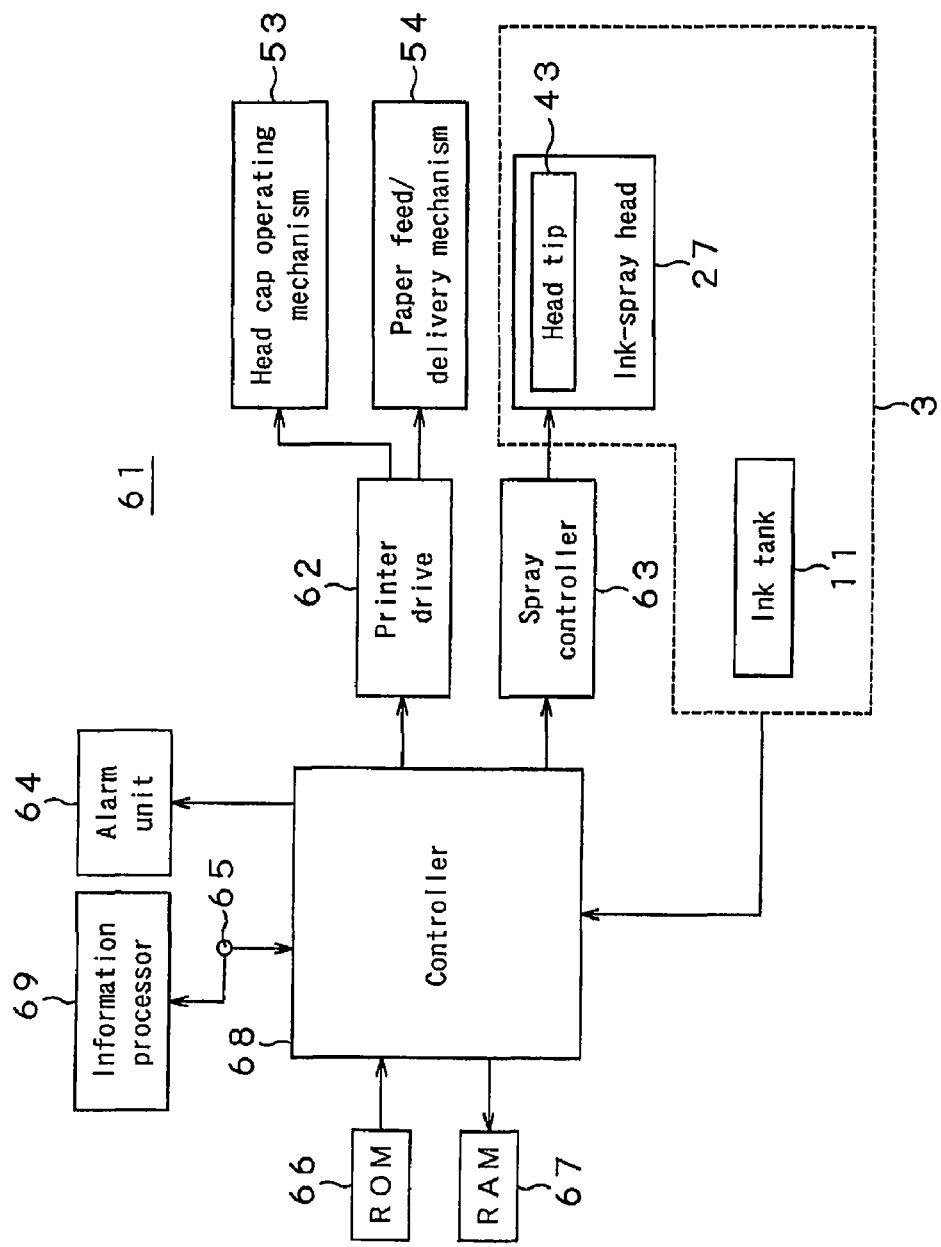
FIG. 12 is a schematic block diagram of a control circuit in the ink jet printer.

Next, a control circuit 61 to control printing by the printer 1 constructed as above will be described with reference to FIG. 12.

The control circuit 61 includes a printer drive 62 to drive each of the drive mechanisms 53 and 54 in the printer body 4, a spraying controller 63 to control the current etc. supplied to the head tip 27 for the ink 2 in each color, an alarm unit 64 to alarm the remaining amount of the ink 2 in each color, an input/output terminal 65 for signal transfer to and from an external device, an ROM (read-only memory) 66 having a control program etc. recorded therein, a RAM (random-access memory) 67 which stores a read control program or the like once and from which such a control program or the like is read as necessary, and a controller 68 to control each of the components of the printer 1.

The printer drive 62 drives, according to a control signal from the controller 68, a drive motor included in the head cap operating mechanism 53 to control the head cap operating mechanism 53 to open and close the head cap 28. Also, the printer drive 62 drives, according to a control signal from the controller 68, a drive motor in the paper feed/eject mechanism 54 to feed the recording paper P through the paper inlet 55 in the printer body 4 to control the paper feed/eject mechanism 54 to deliver the recording paper P having been printed from the paper outlet 56 to outside the printer 1.

The spraying controller 63 is an electric circuit including a switching element to turn on and off the electrical connection with an external power source which supplies pulse current to the resistance heater 48 in the ink-spraying head 27, a resistor to adjust the pulse current for supply to the resistance heater 48, a control circuit to control the operation of turning on and off the switching element, etc.

The spraying controller 63 adjusts, according to a control signal from the controller 68, the pulse current or the like supplied to the resistance heater 48 in the ink-spraying head 27 to control the ink-spraying head 27 to spray ink droplets i from the nozzle 45a.

The alarm unit 64 is a displaying means such as an LCD (liquid crystal display) to display printing conditions, printed state, remaining amount of ink, etc. Alternately, the alarm unit 64 may be a voice outputting means such as speaker, for example. In this case, the alarm unit 64 outputs the printing conditions, printed state, ink remaining-amount, etc. with voice. Also, the alarm unit 64 may be a combination of such a displaying means and voice outputting means. Also, alarming may be made by a monitor or speaker of an external information processor 69.

The input/output terminal 65 sends the information such as the aforementioned printing conditions, printed state, ink remaining-amount, etc. to the external information processor 69, etc. via an interface. Also, the input/output terminal 65 is supplied with a control signal intended for outputting the information such as the printing conditions, printed state and ink remaining-amount, printing data, etc. from the external information processor 69. The information processor 69 is for example an electronic device such as personal computer, PDA (personal digital assistant) or the like.

The input/output terminal 65 to be connected to the information processor 69 or the like may use a serial interface, parallel interface or the like, and more particularly it complies with the Standards such as USB (Universal Serial Bus), RS (recommended Standard) 232C, IEEE (Institute of Electrical and Electronic Engineers) 1394, etc. Also, the input/output terminal 65 may be designed to make data communications, in either cable or radio format, with the information processor 69. It should be noted that the applicable radio communication standards include IEEE 802.11a, 802.11b, 802.11g, etc.

Between the input/output terminal 65 and information processor 69, there may be interposed a network such as Internet. In this case, the input/output terminal 65 is connected to a network such as LAN (local area network), ISDN (integrated services digital network), xDSL (digital subscriber line), FTHP (fiber to the home), CATV (community antenna television), BS (broadcasting satellite) or the like. The data communications are done under any of various protocols such as TCP/IP (transmission control protocol/Internet protocol).

The ROM 66 is for example a memory such as EP-ROM (erasable programmable read-only memory) and has stored therein programs for operations controlled by the controller 68. A program stored in the ROM 66 is loaded to the RAM 67 under the control of the controller 68. The RAM 68 stores a program read by the controller 68 from the ROM 67 and various states of the printer 1.

The controller 68 controls each of the components according to printing data supplied from the input/output terminal 65, data on the remaining amount of the ink 2 supplied from the head cartridge 3, etc. The controller 68 reads a processing program controlling each of the printer components according to a supplied control signal from the ROM 66 and stores it in the RAM 67. It controls the printer components and makes a variety of operations according to the processing program.

Note that although in the control circuit 61 constructed as above, the ROM 66 stores the processing program, the medium to store the processing program is not limited to the ROM 66 but may be any one selected from various recording medium such as an optical disk, magnetic disk, magneto-optical disk, IC card, etc. In the latter case, the control circuit 61 is adapted to be connected to a drive for the recording medium directly or via the information processor 69 and read the processing program from the recording medium.

Figure 13:
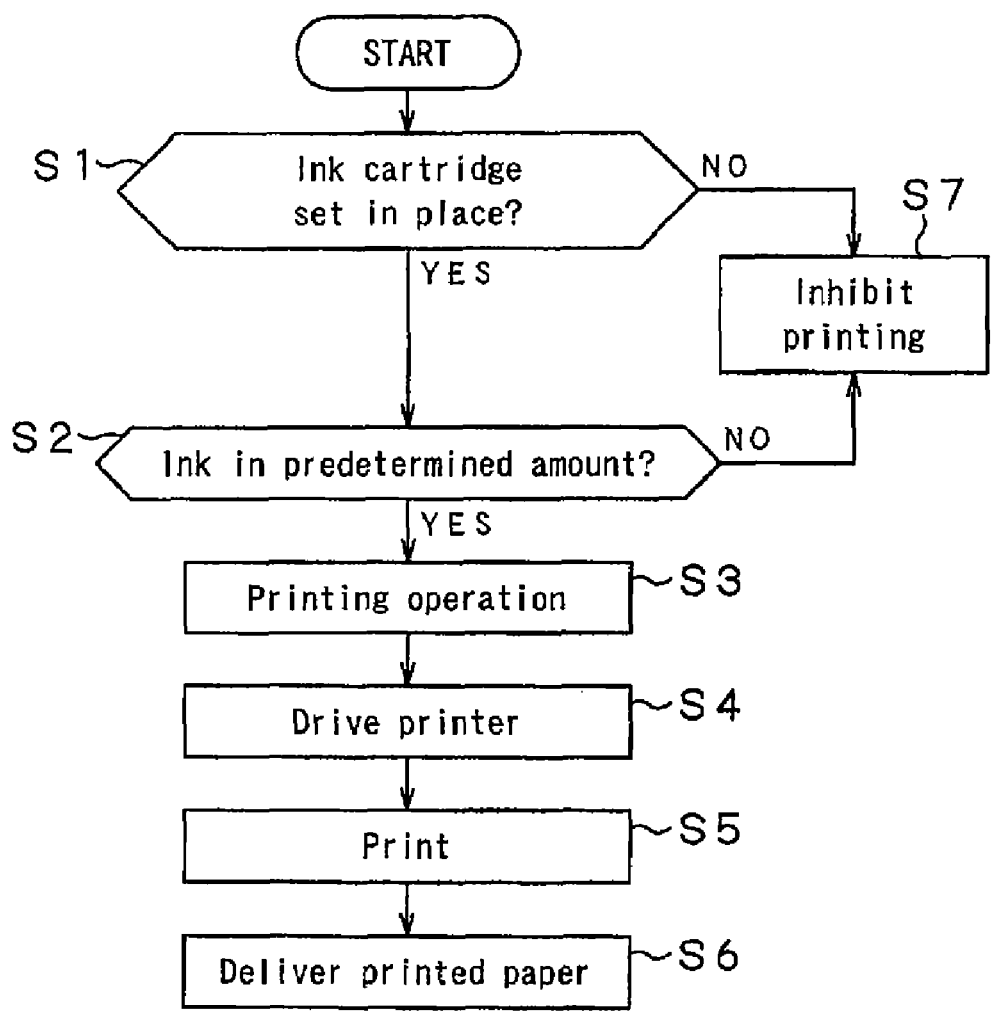
FIG. 13 shows a flow of operations made in printing in the ink jet printer.

The operations made in printing in the printer 1 constructed as above will be explained below with reference to the flow diagram shown in FIG. 13. It should be noted that such printing operations are effected through the computation by a CPU (central processing unit) (not shown) included in the controller 68 according to the processing program stored in the storage means such as the ROM 66.

First, the user operates a control panel or the like provided on the printer body 4 to enter a command for instructing the printer 1 to make a printing operation.

Next, the controller 68 judges in step S1 whether the ink cartridges 11 for predetermined colors are set in the respective receptacles 22. When the ink cartridges 11 for the predetermined colors are appropriately set in all the respective receptacles 22, the controller 68 goes to step S2. If the ink cartridges 11 are not appropriately set in the respective receptacles 22, the controller 68 goes to step S7 where it will inhibit the printer 1 from making any printing operation. In step S2, the controller 68 judges whether the mount of the ink 2 in the in cartridges 11 are smaller than predetermined, that it, whether the ink cartridges 11 are in no-ink state. When having determined that the ink tanks 11 contain no ink 2, the controller 129 controls the alarm unit 64 to alarm the non-ink state and goes to step S7 where it will inhibit any printing operation. On the contrary, when the ink tank 11 contains a larger amount of the ink 2 than predetermined, namely, when it is filled with a sufficient amount of the ink 2, the controller 68 will go to step S3 where it will allow the printer 1 to make a printing operation.

Figure 14:
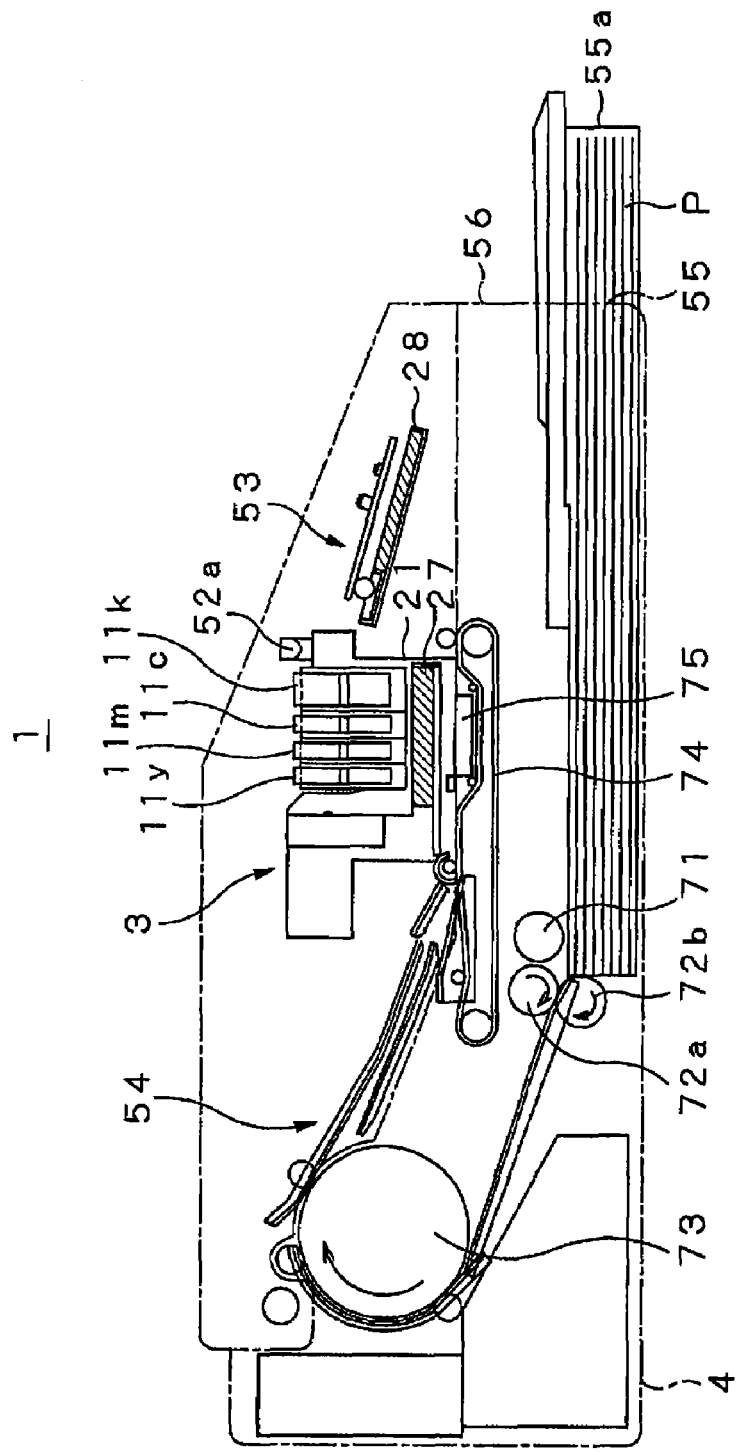
FIG. 14 is a schematic see-through side elevation of a head cap operating mechanism having opened the cap.

For printing by spraying the ink 2 quickly, the controller 68 drives the mechanisms 53 and 54 in step S4 by means of the printer drive 62 to carry the recording paper P to a position where printing can be done. More specifically, the controller 68 drives the drive motor included in the head cap operating mechanism 53 to move the head cap 28 toward the paper tray 55a in relation to the head cartridge 3 and thus expose the nozzle 45a of the ink-spraying head 27 as shown in FIG. 14.

Then, the controller 68 puts the drive motor included in the paper feed/eject mechanism 54 into operation to feed the recording paper P. More specifically, the controller 68 controls the paper feed/eject mechanism 54 so that a feed roller 71 will take out a sheet of the recording paper P from the paper tray 55a and a pair of separation rollers 72a and 72b rotating in the same direction will carry the recording paper P taken out from the paper tray 55a to the reverse roller 73, this reverse roller 73 will reverse the carried direction of the recording paper P and carry the recording paper P to a carrying belt 74 and a retaining means 75 will retain the recording paper P having been carried to the carrying belt 74 in a predetermined position, thereby positioning the recording paper P for spraying the ink 2 as droplets onto the latter.

Next in step S5, the controller 68 controls the ink-spraying head 27 by means of the spraying controller 63 to supply a pulse current to the resistance heater 48 of the head tip 43 at predetermined intervals, and spray the ink droplets i at predetermined intervals from each nozzle 45a to the recording paper P having been carried to the printing position to form images and characters from ink dots on the recording paper P.

At this time, in the ink-spraying head 27, since the ink 2 in the ink channel 42, ink chamber 47, etc. contains a hydrophobic colloid which is charged with a positive zeta potential when the pH of the ink 2 is within a range of 2 to 6, even when the circuit board 44 formed from a silicon wafer and defining the ink channel 42 and ink chamber 47, more specifically, the lateral edge 44a of the circuit board 44, is exposed to the ink 2, silicon, silicon compound or the like is prevented from being eluted from the circuit board 44 into the ink 2.

Therefore, in the ink-spraying head 27, since silicon, silicon compound or the like is prevented from being eluted from the circuit board 44 into the ink 2, it is possible to prevent non-spraying and deteriorated spraying performance due to "cogation" caused by silicon, silicon compound or the like eluted in the ink 2 and deposited on the resistance heater 48, for example, as well as due to clogging of the ink channel 42 and nozzle 45a by silicon, silicon compound or the like deposited in the ink channel 42 and nozzle 45a.

Thus, the ink droplets i will appropriately be sprayed onto the recording paper P being moved by the paper eject/eject mechanism 54 to form characters and images correspondingly to printing data with a high quality. Then, the printed recording paper P is delivered through the paper outlet 56 by the paper feed/eject mechanism 54 in step S6.

In the printer 1 having been illustrated and described in the foregoing, since the ink 2 contains a hydrophobic colloid which is charged with a positive zeta potential when the pH of the ink 2 is within a range of 4 to 6, it is possible to prevent silicon, silicon compound or the like from being eluted from the circuit board 44 into the ink 2 even when the circuit board 44 made of a silicon-containing material such as silicon wafer, for example, is exposed to the ink 2.

Thus, in the printer 1, since the silicon, silicon compound or the like is prevented from being eluted from the circuit board 44 into the ink 2, it is possible to prevent non-spraying and deteriorated spraying performance due to "cogation" caused by silicon, silicon compound or the like eluted in the ink 2 and deposited on the resistance heater 48, for example, as well as due to clogging of the ink channel 42 and nozzle 45a by silicon, silicon compound or the like deposited in the ink channel 42 and nozzle 45a.

Therefore, since the ink droplets i are appropriately sprayed from the nozzles 45a with prevention of the "cogation" on the resistance heater 48 and clogging of the nozzles 45a, the printer 1 can print with a high quality.

Also, in this printer 1, since elution of the silicon or the like from the circuit board 44 is prevented even if the circuit board 44 is exposed to the ink 2 for a long time, the ink-spraying head 27 and the like will not be damaged or inoperable in a short time due to solution of the circuit board 44 and clogging of the nozzles 45a, which will lead to a longer service life of the printer 1.

In the foregoing, the printer 1 in which the head cartridge 3 can be set removably in the printer body 4 and the ink cartridges 11 can be set removably in the head cartridge 3 has been illustrated and explained by way of example. However, the present invention is also applicable to a printer in which the printer body 4 and head cartridge 3 are integrated with each other.

Although the present invention has been illustrated and described taking the application thereof to the printer by way of example, it is not limited to this embodiment but it may widely be applied to an apparatus having a portion in which a fluid flows a channel in which a silicon-containing material is exposed and any other liquid spraying apparatus which sprays a liquid. For example, the present invention is applicable to a facsimile, copier, DNA chip spraying apparatus which sprays a mixture of a liquid and DNA chip (as in the Japanese Patent Application Laid Open No. 2002-253200), a liquid spraying apparatus which sprays a liquid containing conductive particles for forming a wiring pattern on a printed wiring board, etc. for example.

In the foregoing, the ink-spraying head 27 has been described in which the ink 2 is heated by one resistance heater 48 for spraying. However, it is not limited to this type but may a type including a plurality of pressure-producing elements which are supplied with different energies or with an energy at different points of time, thereby controlling the spraying direction.

The aforementioned printer 1 uses the electrothermal transducing system in which the ink 2 is sprayed as droplets while being heated by one resistance heater 48. However, the present invention is not limited this system but may adopt a an electromechanical transducing system in which the ink 2 is sprayed from the nozzles 45a electromechanically by electromechanical transducing element such as piezoelectric element, for example (as in the Japanese Patent Application Laid Open Nos. 65559 of 1980, 160243 of 1987 and 270561 of 1990).

The present invention has been illustrated and explained concerning the line printer 1 by way of example. However, the present invention is not limited to such a line printer but may be applied to a serial type liquid spraying apparatus in which the ink head is moved in a direction generally perpendicular to the moving direction of the recording paper P, for example.

EXAMPLES

Samples of the ink actually prepared as the recording liquid according to the present invention will be described herebelow:

(Sample 1)

As Sample 1 of the recording liquid according to the present invention, yellow ink was prepared. For preparation of the yellow ink, 3 parts by weight of C.I. direct yellow 132 as the pigment which is the colorant of the ink, 76.7 parts by weight of water as the solvent, 10 parts by weight of 2-pyrrolidone as other solvent, 10 parts by weight of glycerin, 0.3 part by weight of acetylene glycol (SURFYNOL 465 by the Air Products) as surface active agent and an appropriate amount of triethanolamine as pH adjuster were mixed together and the ion antecedent was adjusted. Then, an appropriate amount of aluminum oxide was added to the mixture for the entire volume of the ink to contain 10 ppm of aluminum oxide ($Al_2O_3$) as hydrophobic colloid, thereby preparing neutral yellow ink of pH 7 in alkalinity.

(Sample 2)

As Sample 2, yellow ink was prepared similarly to the Sample 1 except that an appropriate amount of aluminum oxide was added for the entire volume of the ink to contain 100 ppm of aluminum oxide.

(Sample 3)

As Sample 3, yellow ink was prepared similarly to the Sample 1 except that an appropriate amount of aluminum oxide was added for the entire volume of the ink to contain 1,000 ppm of aluminum oxide.

(Sample 4)

As Sample 4 of the recording liquid according to the present invention, cyan ink was prepared. For preparation of the cyan ink, 3 parts by weight of C.I. direct blue 199 as the pigment which is the colorant of the ink, 76.7 parts by weight of water as the solvent, 10 parts by weight of 2-pyrrolidone as other solvent, 10 parts by weight of glycerin, 0.3 part by weight of acetylene glycol (SURFYNOL 465 by the Air Products) as surface active agent and an appropriate amount of triethanolamine as pH adjuster were mixed together and the ion antecedent was adjusted. Then, an appropriate amount of aluminum oxide was added to the mixture for the entire volume of the ink to contain 10 ppm of aluminum oxide as hydrophobic colloid, thereby providing alkalescent cyan ink of pH 9 in alkalinity.

(Sample 5)

As Sample 5, cyan ink was prepared similarly to the Sample 4 except that an appropriate amount of aluminum oxide was added for the entire volume of the ink to contain 100 ppm of aluminum oxide.

(Sample 6)

As Sample 6, cyan ink was prepared similarly to the Sample 4 except that an appropriate amount of aluminum oxide was added for the entire volume of the ink to contain 1,000 ppm of aluminum oxide.

(Sample 7)

As Sample 7, yellow ink was prepared similarly to the Sample 1 except that an appropriate amount of barium sulfate ($BaSO_4$) was added as the hydrophobic colloid for the entire volume of the ink to contain 3 ppm of barium sulfate.

(Sample 8)

As Sample 8, cyan ink was prepared similarly to the Sample 4 except that an appropriate amount of barium sulfate was added as the hydrophobic colloid for the entire volume of the ink to contain 3 ppm of barium sulfate.

(Sample 9)

As Sample 9, yellow ink was prepared similarly to the Sample 1 except that an appropriate amount of cerium oxide (CeO) was added as the hydrophobic colloid for the entire volume of the ink to contain 10 ppm of cerium oxide.

(Sample 10)

As Sample 10, cyan ink was prepared similarly to the Sample 4 except that an appropriate amount of cerium oxide was added as the hydrophobic colloid for the entire volume of the ink to contain 10 ppm of cerium oxide.

(Sample 11)

As Sample 11, yellow ink was prepared similarly to the Sample 1 except that no hydrophobic colloid was added.

(Sample 12)

As Sample 12, yellow ink was prepared similarly to the Sample 11 except that the added amount of triethanolamine as the pH adjuster was adjusted to provide alkalescent ink of pH 9 in alkalinity.

(Sample 13)

As Sample 13, cyan ink was prepared similarly to the Sample 4 except that no hydrophobic colloid was added.

(Sample 14)

As Sample 14, blue ink was prepared similarly to the Sample 13 except that the added amount of triethanolamine as the pH adjuster was adjusted to provide neutral ink of pH 7 in alkalinity.

oxide was added for the entire volume of the ink to contain 1 ppm of silica.

Next, for testing the aforementioned Samples of ink, there was used an ink jet printer in which there can be set a head cartridge including a plurality of head tips each having 24 nozzles of 20 μm in diameter and a resistance heater (of 100Ω in resistance) made of Ta and having a length and width both of 20 μm and a thickness of 0.2 μm. Ink cartridges, filled with the Samples of ink, respectively, were set in the head cartridge. With an ink-spraying head being driven to spray the ink from the nozzles of the head tip, successiveness of ink spraying was tested, it was checked whether silicon-containing material was deposited in the ink channel etc. and it was checked whether the ink could not be sprayed from any of the nozzles after the printer was left unused for 6 months.

Note that an ink channel was formed so that an area of 10 $cm^2$ of the lateral edge, not surface-treated, of the circuit board in the head tip would be exposed to 1 ml of the ink flowing through the ink channel. Also, the ink-spraying head was driven by applying it with a power of 0.8 W at a pulse current of 1.5 μsec in pulse width and 10 kHz in frequency. More particularly, the ink-spraying head was driven to spray ink droplets from one nozzle at a rate of about 10,000 tries of spraying per sec.

Table 1 shows the results of the spraying successiveness test and results of checking for deposition of silicon-containing material and non-spraying nozzle, made on each of the Samples of ink.

TABLE 1

| Sample | Hydrophobic colloid | | | Ink pH | Spraying successiveness | Deposition of silicon-containing material | Non-spraying nozzle |
|---|---|---|---|---|---|---|---|
| | Material | Content (ppm) | Zeta potential when ink pH is 4 to 6 | | | | |
| 1 | $Al_2O_3$ | 10 | Positive | 7 | ◯ | ◯ | ◯ |
| 2 | $Al_2O_3$ | 100 | Positive | 7 | ◯ | ◯ | ◯ |
| 3 | $Al_2O_3$ | 1000 | Positive | 7 | ◯ | ◯ | ◯ |
| 4 | $Al_2O_3$ | 10 | Positive | 9 | ◯ | ◯ | ◯ |
| 5 | $Al_2O_3$ | 100 | Positive | 9 | ◯ | ◯ | ◯ |
| 6 | $Al_2O_3$ | 1000 | Positive | 9 | ◯ | ◯ | ◯ |
| 7 | $BaSO_4$ | 3 | Positive | 7 | ◯ | ◯ | ◯ |
| 8 | $BaSO_4$ | 3 | Positive | 9 | ◯ | ◯ | ◯ |
| 9 | CeO | 10 | Positive | 7 | ◯ | ◯ | ◯ |
| 10 | CeO | 10 | Positive | 9 | ◯ | ◯ | ◯ |
| 11 | — | — | — | 7 | X/10000000 tries | X | X |
| 12 | — | — | — | 9 | X/1000000 tries | X | X |
| 13 | — | — | — | 9 | X/1000000 tries | X | X |
| 14 | — | — | — | 7 | X/10000000 tries | X | X |
| 15 | $SiO_2$ | 10 | Negative | 7 | X/20000000 tries | X | X |
| 16 | $SiO_2$ | 10 | Negative | 9 | X/10000000 tries | X | X |
| 17 | $Al_2O_3$ | 1 | Positive | 7 | X/100000000 tries | ◯ | ◯ |

(Sample 15)

As Sample 15, yellow ink was prepared similarly to the Sample 1 except that an appropriate amount of silica ($SiO_2$) was added as the hydrophobic colloid for the entire volume of the ink to contain 10 ppm of silica.

(Sample 16)

As Sample 16, yellow ink was prepared similarly to the Sample 15 except that the added amount of triethanolamine as the pH adjuster was adjusted to provide alkalesent ink of pH 9 in alkalinity.

(Sample 17)

As Sample 17, yellow ink was prepared similarly to the Sample 1 except that an appropriate amount of aluminum Note that in Table 1, "◯" indicates that a succession of 200,000,000 or more tries of successful spraying was attained with spraying, at the above-mentioned rate, the ink having been stored in each head cartridge for one week at 60° C., and "x" indicates that no spraying or unsuccessful spraying occurred before a succession of 200,000,000 tries of successful spraying was attained and also indicates the number of tries of spraying having been made before non-spraying or unsuccessful spraying occurred. For checking the deposition of the silicon-containing material, the filter in the coupling, ink channel, ink chamber, etc. were visually checked for any such deposition after having stored the ink in each head cartridge at 60° C. for 6 months. In Table 1, "◯" indicates deposition of no silicon-containing material and "x" indicates deposition of the silicon-containing material. For checking the non-spraying nozzle, the ink droplets were sprayed at the aforementioned rate after the ink had been stored in each head cartridge at 60° C. for 6 months. In Table 1, "O" indicates that the ink droplets were successfully sprayed from all the nozzles, and "x" indicates that the ink was not successfully sprayed from any one of the nozzles.

The test results in Table 1 reveals that the Samples 1 to 10 containing the hydrophobic colloid, which will be charged with a positive zeta potential when the ink pH is within a range of 4 to 6, in a range of 3 ppm to 1,000 ppm are superior in all respects of the spraying successiveness, deposition of silicon-containing material and non-spraying nozzle to the Samples 11 to 14 containing no hydrophobic colloid.

In the Samples 11 to 14 not containing the hydrophobic colloid, the silicon-containing material is deposited in the ink after it has been used or stored for a long time, leading to "cogation" on the resistance heater and clogging of the nozzles. Thus, the non-spraying of ink will be caused and the spraying performance will be deteriorated.

In the Samples 1 to 10, however, since the aluminum oxide, cerium oxide or barium oxide as the hydrophobic colloid is charged with a positive zeta potential when the pH of the ink is within a range of 4 to 6, when the ink becomes acidic around the circuit board after the silicon or the like starts being eluted from the lateral edge of the circuit board exposed to neutral or alkalescent ink, the hydrophobic colloid is charged with a positive zeta potential and adheres to the lateral edge of the circuit board to prevent the silicon and silicon compound from being eluted from the circuit board.

Thus, even after the Samples 1 to 10 has been used or stored for a long time, no silicon or the like will be eluted from the circuit and thus it is possible to prevent any "cogation" that the eluted silicon or silicon compound will be deposited as a silicon-containing material on the resistance heater. Also, it is possible to prevent the silicon or the like eluted from the circuit board from being deposited as a silicon-containing material in the ink channel and the like and thus prevent any clogging from being caused by such deposition. Therefore, the Samples 1 to 10 can prevent the non-spraying of ink and deterioration of the spraying performance.

Also as will be known from Table 1, the Samples 1 to 10 containing the aluminum oxide, cerium oxide and barium oxide as the hydrophobic colloid are superior in all respects of the spraying successiveness, deposition of silicon-containing material and non-spraying of the ink to the Samples 15 and 16 containing silica as the hydrophobic colloid.

As will be seen from the characteristic curves shown in FIG. 4, since silica in the Samples 15 and 16 will be not charged with any positive zeta potential when the ink pH is within a range of 4 to 6, even when the ink becomes acidic around the circuit board after silicon or the like starts being eluted from the lateral edge of the circuit board exposed to the neutral or alkalescent ink, the silica will not adhere to the negatively charged lateral edge of the circuit board but the silicon or the like is continuously eluted from the lateral edge of the circuit board, resulting in "cogation" on the resistance heater and clogging of the nozzles. Thus, the non-spraying of ink will be caused and the spraying performance will be deteriorated.

In the Samples 1 to 10, however, the aluminum oxide, cerium oxide or barium oxide as the hydrophobic colloid in the Samples 1 to 10 is appropriately charged with a positive zeta potential when the ink becomes acidic around the circuit board after silicon or the like starts being eluted from the lateral edge of the circuit board exposed to, for example, neutral or alkalescent ink, as will be seen from the characteristic curves shown in FIG. 4. So the hydrophobic colloid appropriately adheres to the lateral edge of the circuit board negatively charged to appropriately prevent silicon or silicon compound from being eluted from the circuit board. Therefore, with the Samples 1 to 10, it is possible to prevent the non-spraying of ink and deterioration of the spraying performance.

As seen from the test results shown in Table 1, the Samples 1 to 10 are superior in spraying successiveness to the Sample 17 containing aluminum oxide in 1 ppm as the hydrophobic colloid.

With the Sample 17, since the amount, 1 ppm, of the aluminum oxide as the hydrophobic colloid is too small, when the ink becomes acidic around the circuit board after silicon or the like starts being eluted from the lateral edge of the circuit board exposed to neutral or alkalescent ink, for example, the aluminum oxide will adhere in a small amount to the lateral edge of the circuit board negatively charged. With a succession of about 100,000,000 tries of spraying this Sample 17, "cogation" on the resistance heater and clogging of the nozzles will occur, resulting in non-spraying of the ink.

Since the Samples 1 to 10 contain 10 to 1,000 ppm of the hydrophobic colloid which will be charged with a potential zeta position when the pH of the ink is within a range of 4 to 6 and this amount of the hydrophobic colloid is appropriate, when the ink becomes acidic around the circuit board after silicon or the like starts being eluted from the lateral edge of the circuit board, the hydrophobic colloid will appropriately adhere to the lateral edge of the circuit board negatively charged to prevent "cogation" on the resistance heater and clogging of the nozzles so that ink droplets can be sprayed more than 200,000,000 times in succession.

As will be known from the foregoing description, the addition, to ink being preparation, 10 to 1,000 ppm of aluminum oxide, cerium oxide or barium oxide, as a hydrophobic colloid, which will be charged with a positive zeta potential when the ink pH is within a range of 4 to 6, permits to prevent silicon or silicon compound from being eluted from the circuit board into the ink. That is, the addition of such a hydrophobic colloid is very important for preparing excellent ink which can be sprayed more than 200,000,000 times in succession and will not cause the nozzles, ink channel and the like to be clogged by any silicon-containing material even after the ink has been used or stored for a long time.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, according to the present invention, liquid flowing through a channel in which silicon-containing material is exposed has added thereto a hydrophobic colloid which will be charged with a positive zeta potential when the pH of the liquid is within a range of at least over 4 and under 6. Since the hydrophobic colloid prevents silicon or silicon compound from being eluted from the silicon-containing material into the liquid, any silicon or silicon compound eluted into the liquid can be prevented from being deposited to clog the channel and the like.

Also, in the case the liquid is recording liquid, since silicon or silicon compound can be prevented from being eluted into the liquid and thus from being deposited in the liquid, channel, liquid chamber, etc. to clog the channel and nozzles, it is possible to prevent non-spraying of the recording liquid and deterioration of the spraying performance, which will deteriorate the quality of images formed from the recording liquid.

The invention claimed is:

1. A method of recording on an object by spraying a liquid on the object using a liquid spray apparatus comprising the steps of:

using a recording liquid comprising a pigment, a solvent in which the pigment is dispersed, and a hydrophobic colloid;

charging the hydrophobic colloid with a positive zeta potential and maintaining the pH of the recording liquid in a range of over 4 and under 6;

guiding the recording liquid to a nozzle via a channel in which a silicon-containing material is exposed; and spraying the recording liquid from the nozzle as droplets.

2. The method according to claim 1, wherein the hydrophobic colloid contains one or a mixture of more than one, selected from alumina, cerium oxide, barium oxide and iron hydroxide.

3. The method according to claim 1, wherein the recording liquid further contains more than 3 ppm of the hydrophobic colloid.

* * * * *